(12) United States Patent
Yokoyama et al.

(10) Patent No.: US 8,708,071 B2
(45) Date of Patent: Apr. 29, 2014

(54) COOLING SYSTEM FOR ELECTRIC VEHICLE

(75) Inventors: Atsushi Yokoyama, Hitachiota (JP); Masatsugu Arai, Kasumigaura (JP); Shingo Nasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 13/388,417

(22) PCT Filed: Aug. 25, 2010

(86) PCT No.: PCT/JP2010/064394
§ 371 (c)(1),
(2), (4) Date: Mar. 16, 2012

(87) PCT Pub. No.: WO2011/077782
PCT Pub. Date: Jun. 30, 2011

(65) Prior Publication Data
US 2012/0168140 A1    Jul. 5, 2012

(30) Foreign Application Priority Data

Dec. 21, 2009  (JP) ................................ 2009-289592

(51) Int. Cl.
*B60W 10/00* (2006.01)
*B60W 20/00* (2006.01)

(52) U.S. Cl.
USPC ......... 180/65.265; 180/65.1; 310/52; 310/53; 701/22; 903/930; 165/104.33; 165/287; 165/271

(58) Field of Classification Search
None
See application file for complete search history.

(56) References Cited

U.S. PATENT DOCUMENTS

| 7,332,837 | B2 * | 2/2008 | Ward et al. .................. 310/54 |
| 7,841,307 | B2 * | 11/2010 | Itoga et al. ................ 123/41.12 |
| 2001/0039230 | A1 * | 11/2001 | Severinsky et al. ............... 477/3 |
| 2005/0143877 | A1 * | 6/2005 | Cikanek et al. ................. 701/22 |

(Continued)

FOREIGN PATENT DOCUMENTS

| JP | 11-285106 A | 10/1999 |
| JP | 2006-335281 A | 12/2006 |

(Continued)

OTHER PUBLICATIONS

International Search Report including English translation dated Nov. 22, 2010 (Four (4) pages).

*Primary Examiner* — Helal A Algahaim
*Assistant Examiner* — Paul Castro
(74) *Attorney, Agent, or Firm* — Crowell & Moring LLP

(57) ABSTRACT

A cooling system for an electric vehicle includes: a cooling unit that cools an electric drive unit; and a control unit that controls cooling of the electric drive unit by controlling the cooling unit. The control unit controls the cooling unit in a first cooling mode that provides a first cooling capacity when a force for driving the electric vehicle due to the electric drive unit is in a first operational region, and controls the cooling unit in a second cooling mode that provides a second cooling capacity that is higher than the first cooling capacity when the force due to the electric drive unit is in a second operational region that is higher than the first operational region; and in the second cooling mode, the control unit controls the cooling unit so that the second cooling capacity becomes higher as a rotational speed of the electric drive unit decreases.

6 Claims, 32 Drawing Sheets

(56) References Cited

U.S. PATENT DOCUMENTS

| | | | |
|---|---|---|---|
| 2005/0285457 A1* | 12/2005 | Tsutsui et al. | 310/54 |
| 2009/0249807 A1* | 10/2009 | Nemesh et al. | 62/117 |
| 2010/0107996 A1* | 5/2010 | Shintani et al. | 123/41.11 |
| 2013/0096753 A1* | 4/2013 | Severinsky et al. | 701/22 |

FOREIGN PATENT DOCUMENTS

| | | | |
|---|---|---|---|
| JP | 2007-203772 A | | 8/2007 |
| JP | 2008253098 A | * | 10/2008 |
| JP | 2009-65767 A | | 3/2009 |
| JP | 2009065767 A | * | 3/2009 |

\* cited by examiner

FIG.3
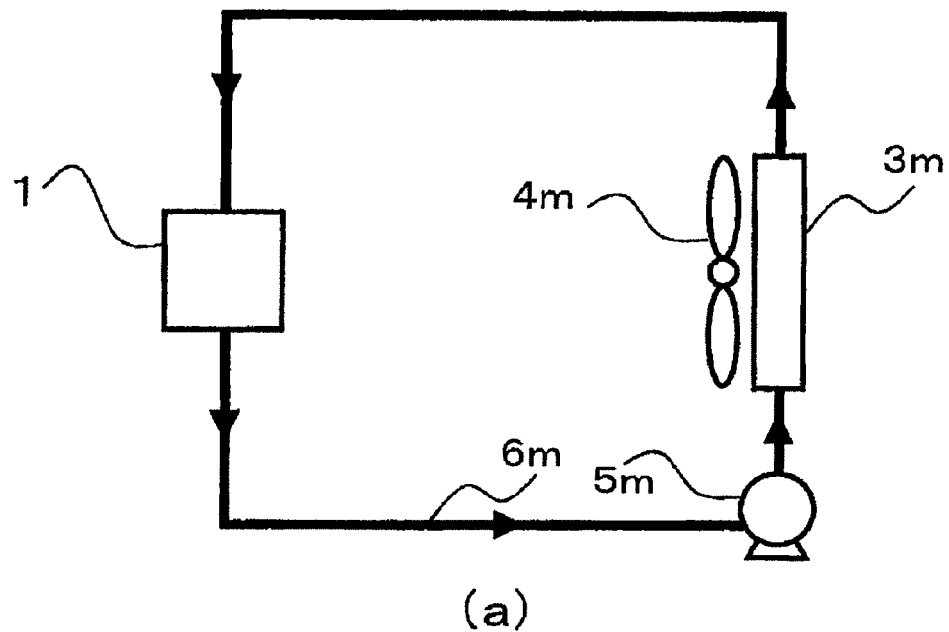
(a)
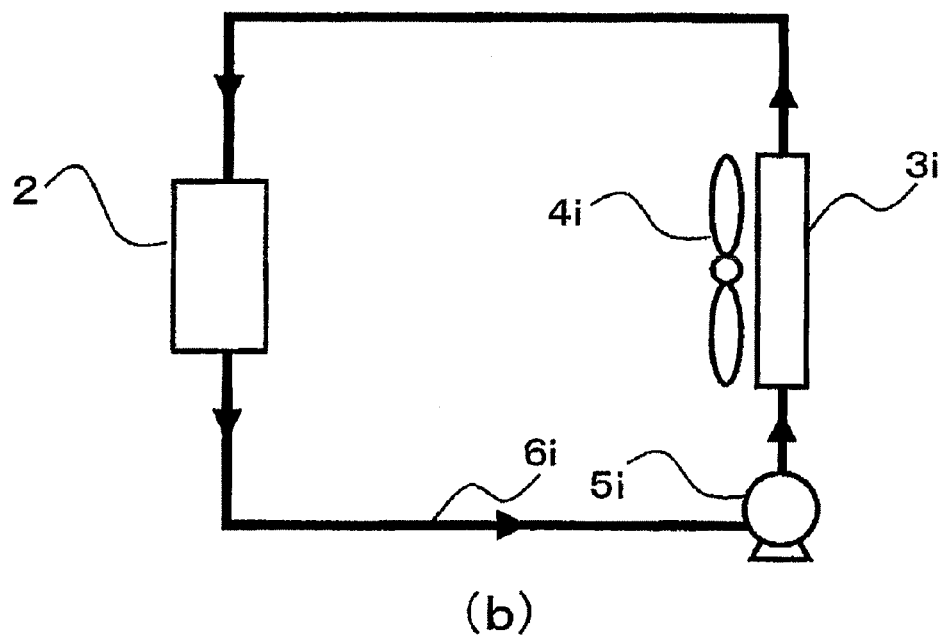
(b)

FIG.4
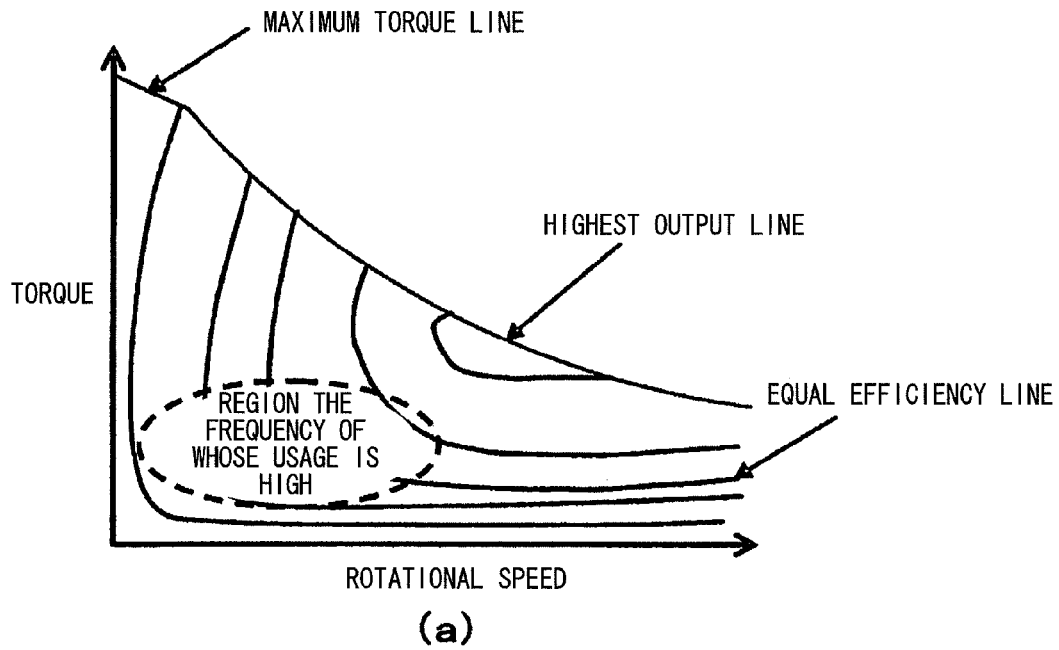
(a)
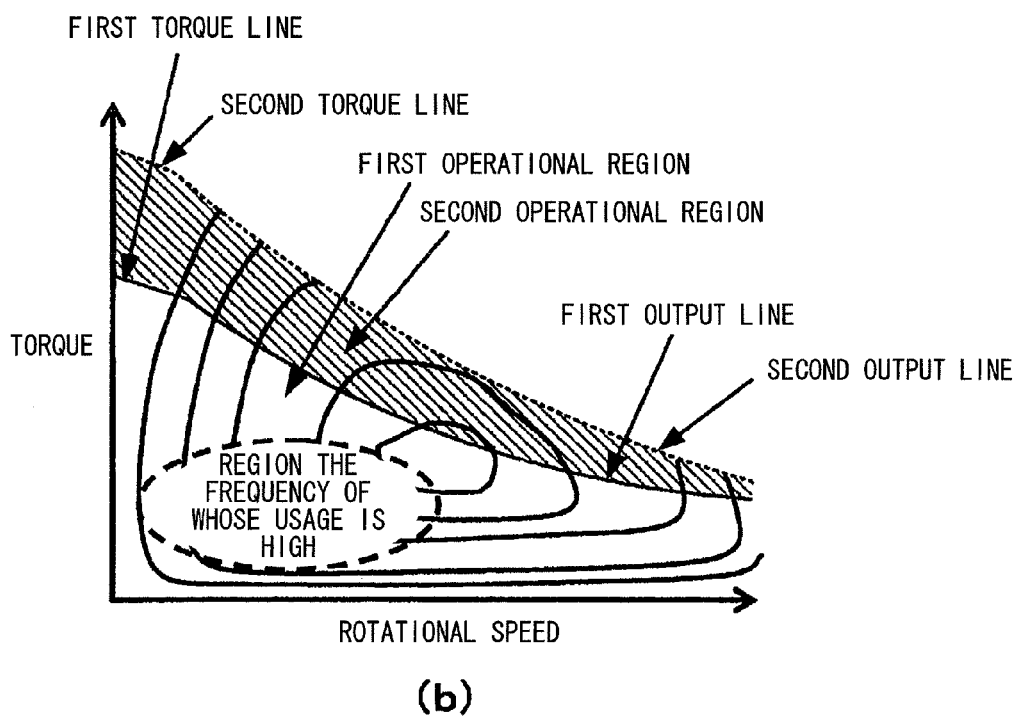
(b)

|  | FIRST COOLING MODE | SECOND COOLING MODE |
|---|---|---|
| FAN | STEADY OPERATION | OPERATION PROPORTIONAL TO MOTOR OUTPUT |
| PUMP | | |

(b)

|  | FIRST COOLING MODE | SECOND COOLING MODE |
|---|---|---|
| FAN | STEADY OPERATION | OPERATION PROPORTIONAL TO MOTOR OUTPUT |
| PUMP | STEADY OPERATION | |

(c)

|  | FIRST COOLING MODE | SECOND COOLING MODE |
|---|---|---|
| FAN | STEADY OPERATION | |
| PUMP | STEADY OPERATION | OPERATION PROPORTIONAL TO MOTOR OUTPUT |

FIG.10
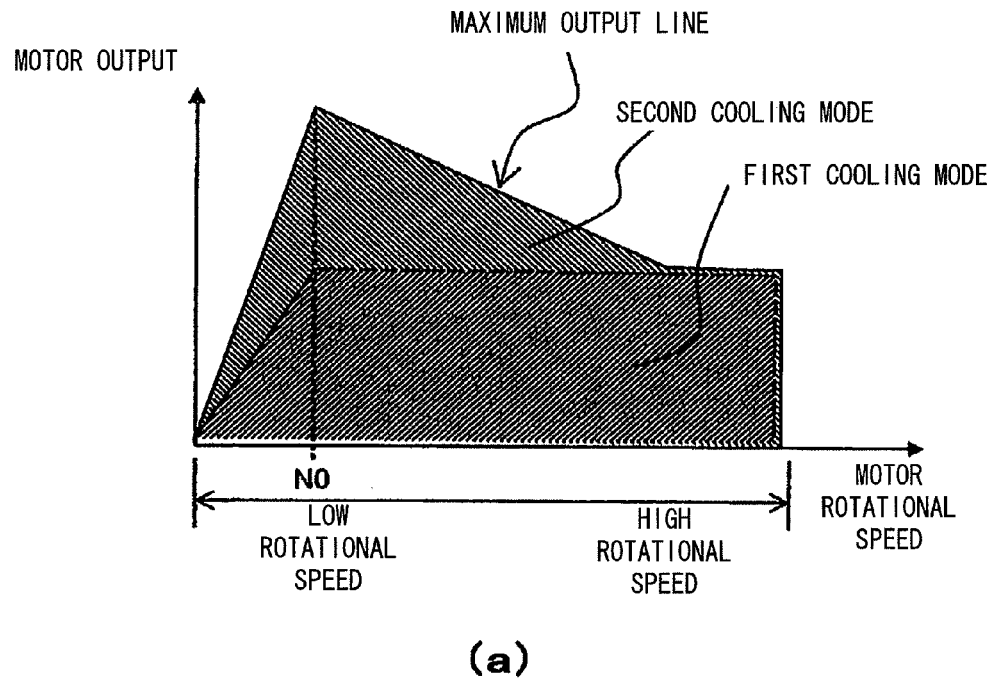
(a)
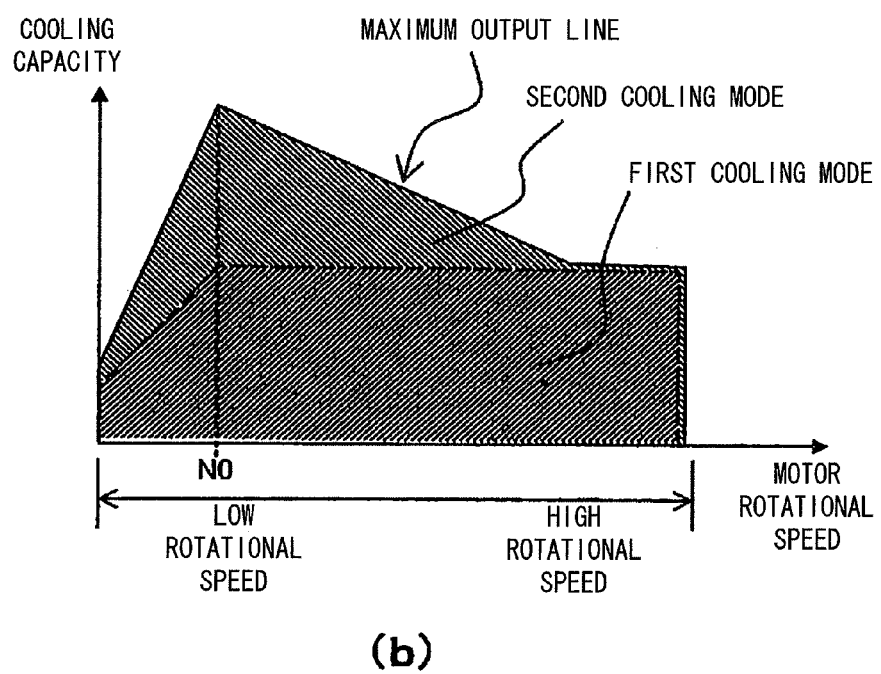
(b)

COOLING SYSTEM FOR ELECTRIC VEHICLE

TECHNICAL FIELD

The present invention relates to a cooling system for an electric vehicle.

BACKGROUND ART

A cooling system for an electric vehicle that cools an electric motor for propelling a hybrid vehicle and its inverter power supply is known (refer to Patent Literature 1).

CITATION LIST

Patent Literature

Patent Literature 1: Japanese Laid-Open Patent Publication H11-285106.

SUMMARY OF INVENTION

Technical Problem

The physical structures of an electric motor for propulsion of a vehicle, and of an inverter device for driving that motor, are determined in consideration of conditions of extremely high load, such as during starting off or acceleration, or during ascent of a slope.

If the physical structures of the motor and of the inverter device are determined so that sufficient output is obtained in the conditions described above in which the load is extremely large, then their physical structures become large.

Solution to Problem

According to the first aspect of the present invention, a cooling system for an electric vehicle comprises: a cooling unit that cools an electric drive unit that electrically drives the electric vehicle; and a control unit that controls cooling of the electric drive unit by controlling the cooling unit. The control unit controls the cooling unit in a first cooling mode that provides a first cooling capacity when a force for driving the electric vehicle due to the electric drive unit is in a first operational region, and controls the cooling unit in a second cooling mode that provides a second cooling capacity that is higher than the first cooling capacity when the force for driving the electric vehicle due to the electric drive unit is in a second operational region that is higher than the first operational region; and in the second cooling mode, the control unit controls the cooling unit so that the second cooling capacity becomes higher as a rotational speed of the electric drive unit decreases.

According to the second aspect of the present invention, in the cooling system for an electric vehicle according to the first aspect, it is preferred that the rotational speed at which a highest operating efficiency point of the electric drive unit is obtained is higher than the rotational speed that yields a maximum value of the second cooling capacity.

According to the third aspect of the present invention, in the cooling system for an electric vehicle according to the second aspect, it is preferred that a speed change ratio of the electric vehicle is determined so that the rotational speed at which the highest operating efficiency point of the electric drive unit is obtained becomes higher than the rotational speed that yields the maximum value of the second cooling capacity.

According to the fourth aspect of the present invention, in the cooling system for an electric vehicle according to the second or the third aspect, it is preferred that a speed of the electric vehicle that corresponds to the highest operating efficiency point of the electric drive unit is higher than ½ of a highest speed of the electric vehicle.

According to the fifth aspect of the present invention, in the cooling system for an electric vehicle according to the first aspect, it is preferred that a torque of the electric drive unit that corresponds to a highest operating efficiency point of the electric drive unit is included within a range of 50% to 75% of a maximum torque that the electric drive unit can provide corresponding to the rotational speed that provides the highest operating efficiency point.

Advantageous Effect of Invention

According to the present invention, it is possible to supply a system in which the physical structures of the motor or the inverter device can be made more compact.

BRIEF DESCRIPTION OF DRAWINGS

FIGS. 3(a) and 3(b) are figures showing the structure of another variant embodiment of this cooling system for an electric vehicle;

FIG. 4(a) is a figure showing the torque characteristic of a motor with respect to rotational speed when control is applied according to a conventional manner of thinking, and FIG. 4(b) is a figure showing the torque characteristic of a motor with respect to rotational speed according to an embodiment of the present invention;

FIGS. 5(a), 5(b), and 5(c) are figures showing methods of operating a fan and a pump in a first cooling mode in a first operational region and in a second cooling mode in a second operational region;

FIG. 10(a) is a figure showing a relationship between the output of the motor and rotational speed, and FIG. 10(b) is a figure showing a relationship between the cooling capacity and rotational speed;

DESCRIPTION OF EMBODIMENTS

In the embodiments explained subsequently, not only the details described in the above sections "SOLUTION TO PROBLEM" and "ADVANTAGEOUS EFFECT OF INVENTION", but also various other problems related to manufacturing production are solved, and various advantageous effects corresponding to these problems are pointed out. Some of these will now be enumerated.

With the following embodiments, it is possible to reduce the amounts of electrical power consumed by one or more cooling devices, for example by a pump and by a fan, so that it is possible to enhance the operating efficiency of the electric vehicle as a whole.

With the following embodiments, it is possible to utilize the heat generated by the inverter device and by the motor for heating the interior of the passenger compartment, so that the energy efficiency is enhanced.

Since, with the following embodiments, it is possible to perform adjustment of the temperature interior to the passenger compartment by utilizing a compressor and a heat exchanger for cooling the inverter device and the motor, accordingly it becomes possible to simplify the system.

Embodiments in which the cooling system for an electric vehicle according to the present invention is applied to an electric automobile will now be explained. However, while extremely satisfactory beneficial effects are obtained by applying the present invention to an electric automobile as explained below, it should be understood that the present invention is not to be considered as being necessarily limited to an electric automobile. Satisfactory beneficial effects may also be obtained if the present invention is applied to an electric vehicle such as a construction machine or the like. Moreover, the present invention can also be applied to an electric vehicle such as an electric train or the like.

In the following embodiments, as examples, the explanation will cite AC motors that are driven by inverter devices. If the motors explained below are motors that employ permanent magnets, then the amounts of heat generated in their rotors are low as compared to induction electric motors, so that it is possible to enhance the efficiency to higher levels as compared to motors of other types.

However, the motors to which the present invention can be applied are not limited to being AC motors. The present invention can be applied to a rotating electrical machine (a motor or a generator) of any type, such as, for example, a DC motor that is driven by a supply of power converted by a thyristor Leonard device or the like, or to a pulse motor that is driven by a chopper power supply, or the like. However, as described above, motors that employ permanent magnets are best from the standpoint of efficiency, compactness, and low weight. After those, induction electric motors are best for automobile or vehicle use.

—First Embodiment—

Figure 1:
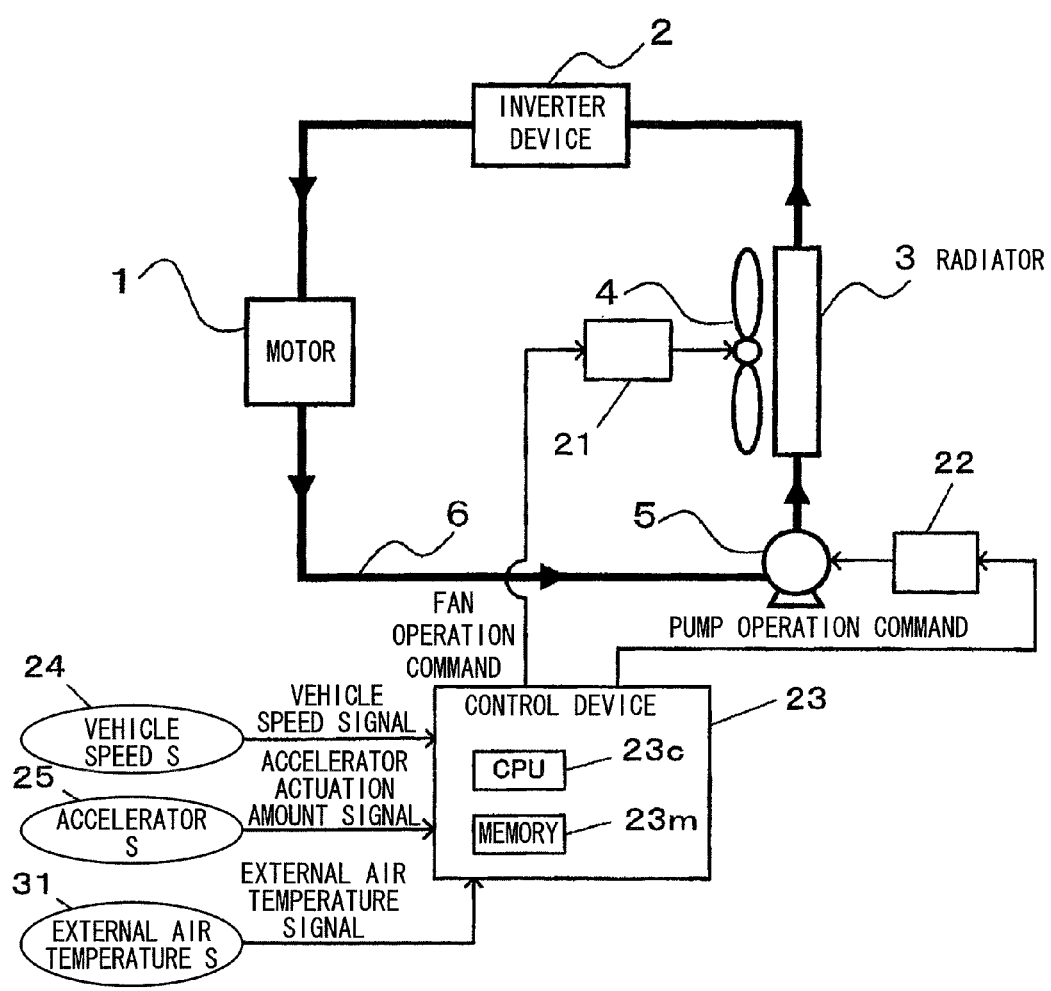
FIG. 1 is a figure showing the structure of a cooling system for an electric vehicle according to a first embodiment.

FIG. 1 shows the structure of a cooling system for an electric vehicle according to the first embodiment, and in particular shows a cooling system that is optimum for an electrically operated automobile. This cooling system for an electric vehicle includes a radiator 3 for cooling a motor 1 that generates torque for propelling the vehicle and an inverter device 2 that generates AC electrical power for driving this motor 1, a fan 4, a pump 5, a coolant circulation path 6, a fan drive device 21, a pump drive device 22, and a control device 23. The coolant circulation path 6 circulates a cooling medium around the path: pump 5→radiator 3→inverter device 2→motor 1→pump 5. The cooling medium that is pressurized and sent from the pump 5 is cooled in the radiator 3 by air blown by the fan 4, cools the inverter device 2 and the motor 1, and then returns back to the pump 5 for a second time. While water is optimum for this cooling medium, it would also be possible to use an oil. The inverter device 2 described above receives electrical power from the exterior (not shown in the drawing), and generates AC electrical power for driving the motor 1 described above on the basis of this electrical power.

The electric automobile described above may be an electric automobile that is purely propelled by an electric motor, or may be a so called hybrid automobile that includes both an engine and an electric motor and is propelled by the propulsive force of both of these, and the electric vehicle described in the present application includes both of these cases. Moreover, the motor 1 in the present application not only is endowed with the function of converting electrical energy into mechanical energy, but also is endowed with the function of acting as a generator that converts mechanical energy into electrical energy. Whether the motor 1 operates so as to generate mechanical energy on the basis of electrical energy, or operates as a generator for converting mechanical energy into electrical energy, is determined on the basis of the operation of the inverter device 2 described above. For example, if the rotating magnetic field of the stator of the motor 1 due to the AC electrical power generated by the inverter is leading with respect to the magnetic pole position of the rotor of the motor 1, then the motor 1 generates torque on the basis of electrical energy. On the other hand, if the rotating magnetic field of the stator of the motor 1 due to the AC electrical power generated by the inverter is trailing with respect to the magnetic pole position of the rotor of the motor 1, then the motor 1 operates as a generator and generates electrical energy on the basis of mechanical energy.

In this embodiment, the cooling medium that has been cooled by heat dissipation by the radiator 3 is first sent to the inverter device 2, and, after having cooled the inverter device 2, is sent to the motor 1 and cools the motor 1. The inverter device 2 includes power semiconductor elements for converting DC electrical power into AC electrical power, or converting AC electrical power into DC electrical power. The power semiconductor elements described above generate heat during their switching operation for performing the above described conversion operations, and accordingly the temperatures of the power semiconductor elements become elevated. The thermal capacity of the circuit portion of the inverter device 2 that includes the power semiconductor elements described above is small, and, when the current for driving the motor 1 increases, this temperature rises quickly on the basis of the increase of the amount of heat that is generated. Furthermore, the power semiconductor elements described above can easily themselves experience damage due to this high temperature. As described above, the thermal time constant of the inverter device 2 is smaller than that of the motor 1, and accordingly, in order to keep the temperature rise low, it is extremely desirable for the cooling path first to circulate the cooling medium to the inverter device 2 to cool it, and thereafter to circulate the cooling medium to the motor 1 to cool it. However, it would also be possible first to circulate the cooling medium 1 to the motor 1 to cool it, and thereafter to circulate the cooling medium to the inverter device 2 to cool it.

Figure 2:
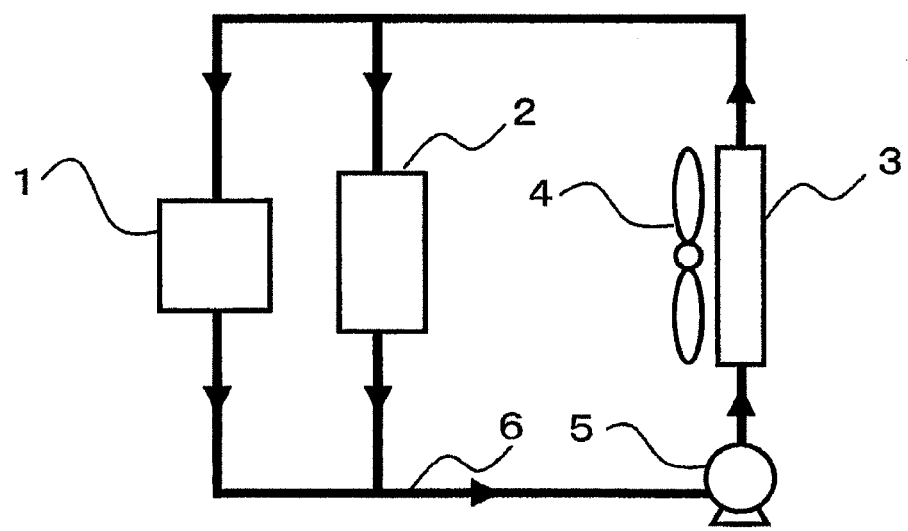
FIG. 2 is a figure showing the structure of a variant embodiment of this cooling system for an electric vehicle.

Moreover, as shown in FIG. 2, it would also be acceptable to arrange to connect the coolant circulation path 6 to the motor 1 and to the inverter device 2 in parallel, so that the cooling medium that has been pressurized by the pump 5 and expelled is circulated via the radiator 3 to the motor 1 and to the inverter device 2 in parallel. Furthermore, it would also be acceptable to arrange to provide separately a coolant circulation path 6m, a pump 5m, and a radiator 3m for the motor 1 as shown in FIG. 3(a), and a coolant circulation path 6i, a pump 5i, and a radiator 3i for the inverter device 2 as shown in FIG. 3(b). In FIG. 3(a), the cooling medium that has been pressurized by and expelled from the pump 5m is cooled in the radiator 3m by air blown by a fan 4m, and thereafter is conducted to the motor 1 and cools the motor 1, then returning to the pump 5m. Moreover, in FIG. 3(b), the cooling medium that has been pressurized by and expelled from the pump 5i is cooled in the radiator 3i by air blown by a fan 4i, and thereafter is conducted to the inverter device 2 and cools the inverter device 2, then returning to the pump 5i.

While, in this first embodiment, an example is shown in which the subjects to be cooled by the cooling system for an electric vehicle are the motor 1 and the inverter device 2, it would also be acceptable to arrange for the subject to be cooled to be only one among the motor 1 and the inverter device 2. Moreover, apart from the motor 1 and the inverter device 2, it would also be acceptable to add, as a subject for cooling, an electricity storage device (to be described hereinafter) that performs transfer of DC electrical power to/from the inverter device 2.

In FIG. 1, the control device 23 includes a CPU 23c and a memory 23m and so on, and controls the fan drive device 21 and the pump drive device 22 by executing a cooling control program that will be described hereinafter, thus controlling the cooling of the motor 1 and the inverter device 2. A vehicle speed sensor 24 that detects the speed of this automobile, an accelerator sensor 25 that detects the amount of actuation of an accelerator pedal of this automobile, and so on are connected to the control device 23.

Next, the method in this first embodiment for designing the physical structures (i.e. the sizes and the dimensions) of the motor 1 for propelling the electric automobile and of the inverter device 2 will be explained. Generally, there is a mutual correlation relationship between the physical structure of the motor and the inverter device, the maximum torque and the highest output, and the cooling capacity. For example, if the physical structure of the motor and the cooling capacity are determined, then the heat generation amount in the motor itself in order to keep the motor at or below its upper limit temperature is determined, and the maximum torque and the highest output of the motor that cause the generation of this amount of heat are determined. Moreover, if the physical structure of the motor and its maximum torque and highest output are determined, then the cooling capacity in order to keep the motor at or below its upper limit temperature is determined. On the other hand, the physical structures of the motor and of the inverter power supply are proportioned to the maximum torque and to the highest output, and the larger are these physical structures, the higher are the maximum torque and the highest output.

In the prior art, the physical structure of a motor and an inverter power supply were designed on the basis of the maximum torque and/or the highest output needed during starting off from rest, during acceleration, during ascent of a slope, and so on. However, in the case of an actual vehicle, the torque and the output that are ordinarily employed have values smaller than the maximum torque and the highest output, and, during normal traveling, the frequency at which the maximum torque and the highest output are required is low, and the time intervals over which they are required are short. In the prior art, irrespective of the fact that during steady traveling the torque and the output are low, motors and inverter power supplies were used having large physical structures that were designed by taking, as a standard, the maximum torque and the highest output that were only used over short time intervals at low frequencies of usage. However in this first embodiment, by performing appropriate cooling of the motor and the inverter device, it becomes possible to make the physical structures of the motor and the inverter power supply more compact, while still providing the required maximum torque and highest output.

FIG. 4(a) shows the torque characteristic of a motor with respect to its rotational speed that is a conventional design objective, while FIG. 4(b) shows the torque characteristic of the motor 1 with respect to its rotational speed in the first embodiment of the present invention. As shown in FIG. 4(a), with a motor based upon a conventional design objective, in the region where the rotational speed is low, the torque that is used is limited to a maximum torque or less. In FIG. 4(a), this is shown as a maximum torque line.

And, in the region in which the rotational speed is higher, the torque is used within the range of constant output with the output being limited to the highest output or less, or, to put it in another manner, within the range in which the torque drops along with increase in the rotational speed. In FIG. 4(a), this is shown as a highest output line. In FIG. 4(a), according to the conventional design objective, the physical structures of the motor and of the inverter power supply are provided in consideration of the maximum torque and the highest output required during starting off from rest, acceleration, ascent of a slope and so on as being extremely important.

By contrast, with the motor 1 and the inverter device 2 of the first embodiment, as shown in FIG. 4(b), the operational range determined by the rotational speed and the torque of the motor 1 is widened by arranging to include a second operational region (the hatched region) in addition to the first operational region. The first operational region is the region that is below a first torque line and a first operating line shown by the solid lines. And the second operational region is the region that is above the first torque line and the first operating line shown by the solid lines, and that moreover is below a second torque line and a second operating line shown by the broken lines. Along with the first operational region being taken as a region for operating during the light load that is required during steady traveling such as when traveling at an almost constant speed along a level road or the like, the second operational region is taken as a region for operating during heavy load when greater torque and output are required than during steady travelling, such as during starting off from rest, during acceleration, during ascent of a slope, or the like.

In FIG. 4(b), the torque on the second torque line and the output on the second output line in the second operational region are equal to or greater than the maximum torque of the motor on the maximum torque line and its highest output on the highest output line shown in FIG. 4(a). Moreover, the boundary line between the first operational region and the second operational region shown by the solid line is shown by a first torque line upon which the torque is lower than the torque on the second torque line in the second operational region, and by a first output line upon which the output is lower than the output on the second output line in the second operational region.

Furthermore in this first embodiment, the cooling capacity of the cooling system for the motor 1 and the inverter device 2 is controlled on the basis of the torque characteristic with respect to rotational speed of the motor, as shown in FIG. 4 described above. For example, according to control by the method that will next be explained, it is possible to obtain an output that is relatively large for the physical structure of the motor or the inverter device, while still being able to cope with thermal problems. The cooling capacity is controlled in consideration of the first operational region and the second operational region described above, and the cooling capacity in the second operational region where the torque and the output are large is made to be higher than the cooling capacity in the first operational region. In the first operational region, the operation of the fan 4 and the pump 5 is controlled so as to provide a cooling capacity that ensures that the motor 1 and the inverter device 2 do not go above their respective upper limit temperatures while torque and output are continuously being generated by the motor 1 and the inverter device 2 in the region surrounded by the first torque line and the first output line shown by the solid lines in FIG. 4(b). In this specification, the cooling mode for the motor 1 and the inverter device 2 in the first operational region is termed the first cooling mode.

On the other hand, in the second operational region, the operation of the fan 4 and the pump 5 is controlled so as to provide a cooling capacity that ensures that the motor 1 and the inverter device 2 do not go above their respective upper limit temperatures while torque and output are generated over a short time interval by the motor 1 and the inverter device 2 in the hatched region surrounded by the second torque line and the second output line shown by the broken lines in FIG. 4(b). In this specification, the cooling mode for the motor 1 and the inverter device 2 in the second operational region is termed the second cooling mode.

The torque and the output in the first operational region surrounded by the first torque line and the first output line are not the large torque and the large output that are required during heavy load, such as during starting off of the electric vehicle from rest, during acceleration, during ascent of a slope, or the like. The torque and the output in this first operational region are torque and output during the light load that is demanded during steady traveling, such as during traveling on a level road that does not ascend or descend very much and with low acceleration and deceleration and at an almost constant speed, and are representative torque and output that can be generated continuously. In other words, the torque on the first line is a continuously rated torque, and the output on the first output line is a continuously rated output.

By contrast, the torque and the output in the second operational region surrounded by the second torque line and the second output line are larger torque and higher output than those during steady travelling, and are such as are required during heavy load such as during starting off of the electric vehicle from rest, during acceleration, during ascent of a slope, or the like. This type of large torque has a low probability of being demanded continuously over a long time interval, and rather there is a tendency for demand therefor to be terminated after a short time interval. In other words, the torque on the second line is a short term rated torque, and the output on the second output line is a short term rated output.

Here by a short time interval is meant a representative time interval in which it is necessary to generate greater torque and a greater output during heavy load, such as during starting off of the electric vehicle from rest, during acceleration, during ascent of a slope, or the like, than those during steady travelling. Moreover, the upper limit temperature for the motor 1 is determined on the basis of the permitted temperature for the insulation material or the like of the motor 1, and the upper limit temperature for the inverter device 2 is determined on the basis of the permitted temperature for its switching elements for electrical power conversion and so on.

FIGS. 5(a) through 5(c) show methods of operating the fan 4 and the pump 5 in the first cooling mode in the first operational region and in the second cooling mode in the second operational region. As shown in FIGS. 5(a) through 5(c), with each of these cooling methods, the fan 4 and/or the pump 5 are operated so that the cooling capacity in the second cooling mode becomes higher than the cooling capacity in the first cooling mode.

In the first cooling mode, the operation of the fan 4 and the pump 5 is controlled so as to keep both the motor 1 and the inverter device 2 at or below their respective upper limit temperatures, while continuously generating the above described small torque and output during steady traveling. And, in the second cooling mode, the operation of the fan 4 and the pump 5 is controlled so as to keep both the motor 1 and the inverter device 2 at or below their respective upper limit temperatures, while generating, over a short time interval, the large torque and output that are required during heavy load such as during starting off of the electric vehicle from rest, during acceleration, during ascent of a slope, or the like.

With the method for operating the fan 4 and the pump 5 shown in FIG. 5(a), in the first cooling mode, the fan 4 and the pump 5 are both operated steadily at predetermined speeds. And, in the second cooling mode, the fan 4 and the pump 5 are both controlled on the basis of the torque or of the output generated by the motor 1. For example, control may be performed so that the capacity of the cooling fan 4 or of the pump 5 is proportional to the torque or to the output of the motor 1 described above.

Moreover, with the method for operating the fan 4 and the pump 5 shown in FIG. 5(b), the methods for operating the fan 4 and the pump 5 are different from one another. In the first cooling mode, the fan 4 is operated steadily at a predetermined speed, while, in the second cooling mode, it is operated on the basis of the torque or of the output generated by the motor 1, for example at a cooling capacity that is proportional thereto. By contrast, in both the first cooling mode and the second cooling mode, the pump 5 is operated steadily at a predetermined speed. And in a similar manner, with the method for operating the fan 4 and the pump 5 shown in FIG. 5(c), the methods for operating the fan 4 and the pump 5 are mutually different. In both the first cooling mode and the second cooling mode, the fan 4 is operated steadily at a predetermined speed. By contrast, in the first cooling mode, the pump 5 is operated steadily at a predetermined speed, while, in the second cooling mode, it is operated on the basis of the torque or of the output generated by the motor 1, for example at a cooling capacity that is proportional thereto.

According to the operating methods shown in FIGS. 5(a) through 5(c) described above as methods for operating the fan 4 and the pump 5 in the first cooling mode and in the second cooling mode, there is the beneficial effect that appropriate operations before any rise in temperature can be performed through more simplified control for the influence of the heat generated in accordance with the mode of operation. However, this beneficial effect is not limited to these methods; a beneficial effect of such a type can be obtained if any method of operation is employed in which the cooling capacity in the second cooling mode becomes higher than the cooling capacity in the first cooling mode. It should be understood that it is possible to operate the fan 4 and the pump 5 with good efficiency, as compared to the case of performing steady operation, by applying the method of operation, among the above described methods of operation, in which the fan 4 or the pump 5 is operated with a cooling capacity that is proportioned to the torque or to the output generated by the motor 1.

Figure 6:
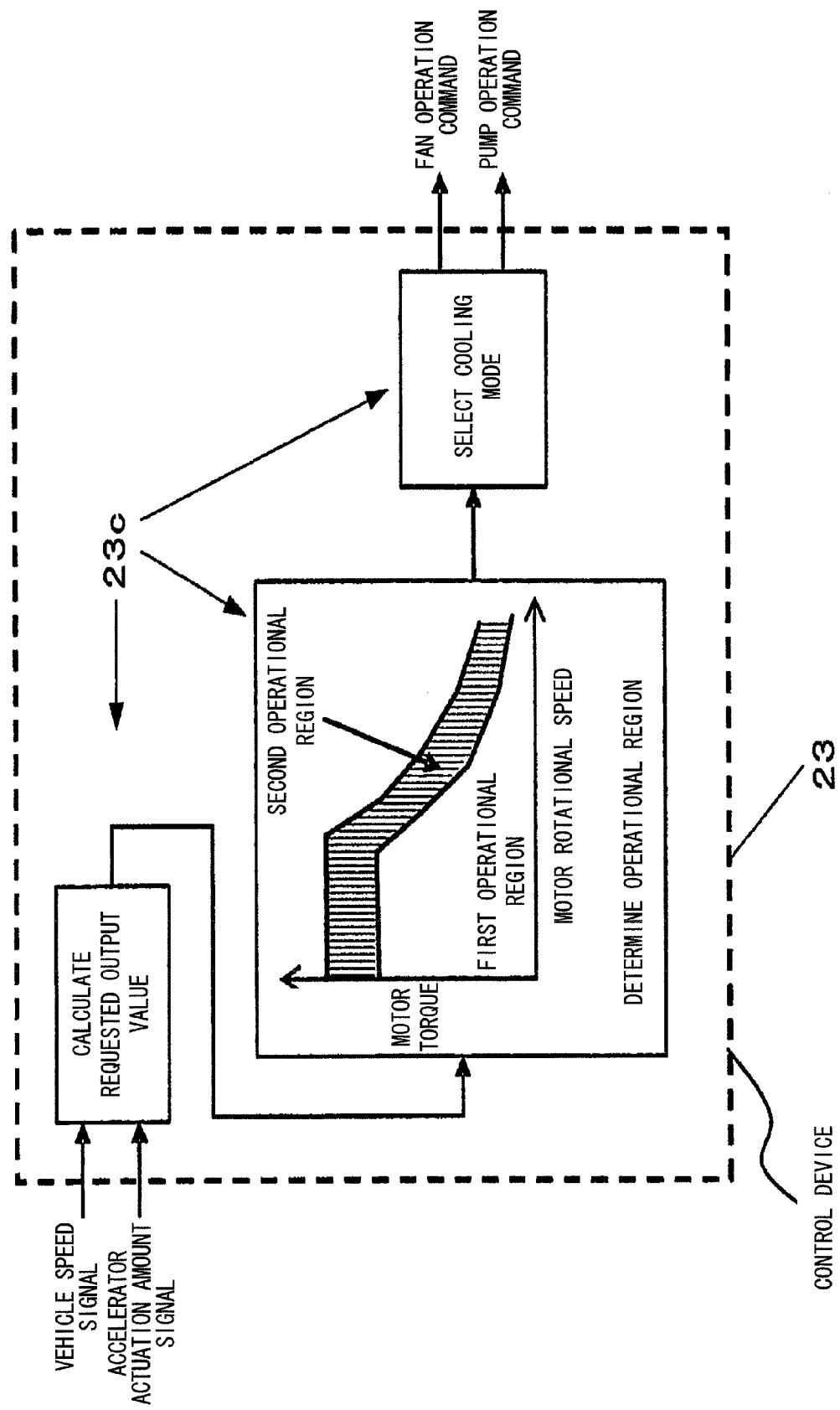
FIG. 6 is a block diagram showing cooling mode selection control in the first embodiment.
Figure 7:
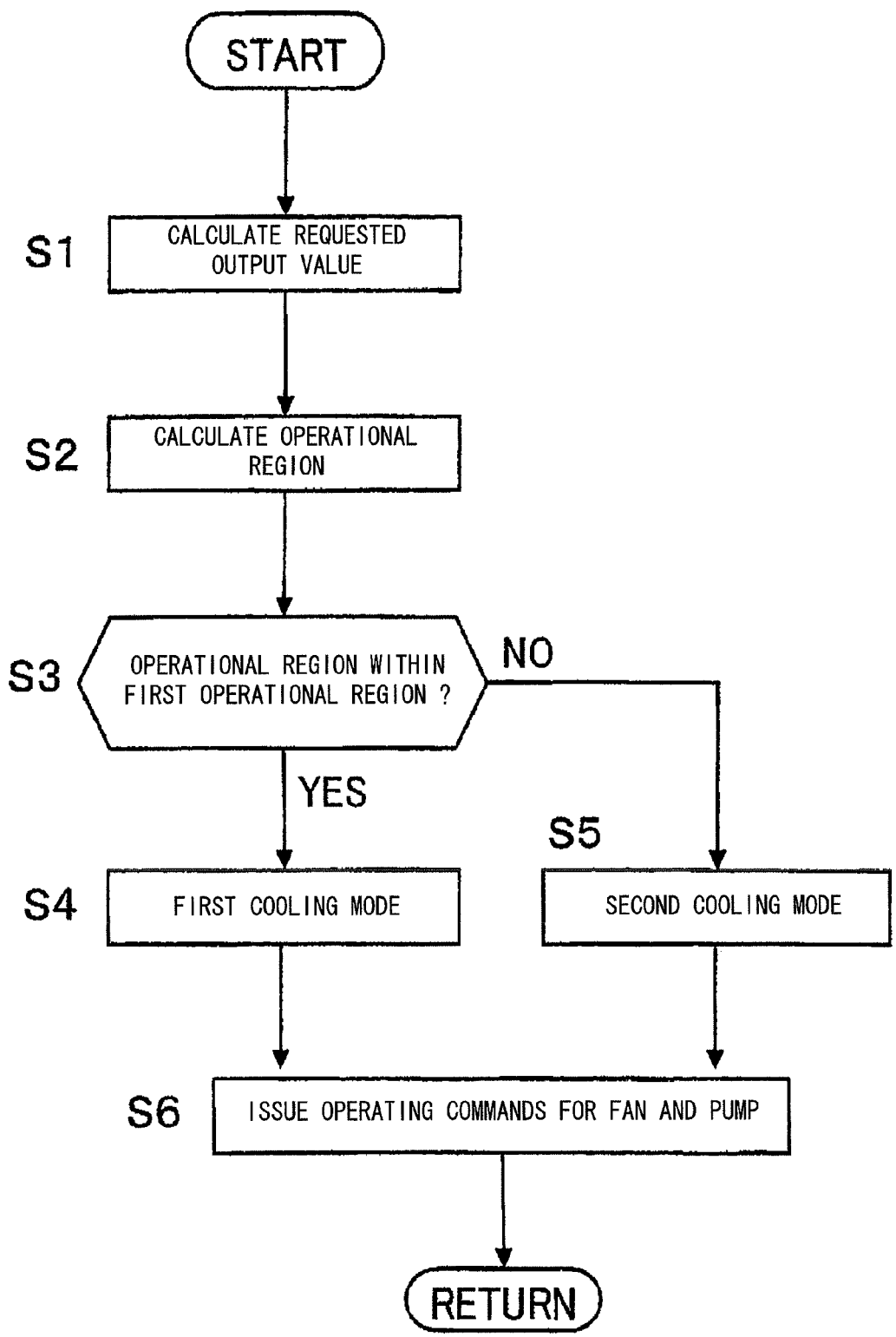
FIG. 7 is a flow chart showing a cooling mode selection control program of the first embodiment.

FIG. 6 is a block diagram showing cooling mode selection control in the first embodiment, and FIG. 7 is a flow chart showing a cooling made selection control program in the first embodiment The cooling mode selection operation in the first embodiment will now be explained with reference to these figures. The CPU 23c of the control device 23 repeatedly executes the cooling mode selection control program shown in FIG. 7 while an ignition key switch (not shown in the figures) is turned on, this program including the cooling mode selection control blocks shown in FIG. 6 in the form of microcomputer software, The reference symbols S in FIG. 7 denote steps. For example, the reference symbol S1 denotes a step 1, while the reference symbol S2 denotes a step 2. In the step 1, when a vehicle speed signal is inputted from the vehicle speed sensor 24 and a signal specifying the accelerator actuation amount is inputted from the accelerator sensor 25, the control device 23 calculates a requested output value for the motor 1 on the basis of these signals. The amount of actuation of the acceleration pedal is a request for propulsive force for propelling the vehicle, and may be considered as specifying a requested value for the torque of the motor 1 of the electric vehicle. Accordingly, the accelerator actuation amount is converted into a requested torque value and is multiplied by the vehicle speed, and thereby a requested value is calculated for the drive force for propelling the vehicle, in other words a requested value for the output of the motor 1 is calculated.

In the step 3, according to the requested torque value and the vehicle speed, a decision is made as to whether the operating point, as determined by the torque and the rotational speed of the motor 1, is within the first operational region described above or is within the second operational region. First, along with converting the requested torque value for the electric vehicle into a torque for the motor 1 according to the speed change ratio of a transmission (not shown in the figures), also the vehicle speed is converted into a rotational speed for the motor 1 according to the speed change ratio of the transmission, and the operating point of the motor 1 that corresponds to this torque and this rotational speed is determined. Next, a decision is made as to whether this operating point of the motor 1 is within the first operational region or is within the second operational region, and a cooling mode is selected according to the operational region that results from this decision.

If the operating point of the motor 1 is within the first operational region, then the flow of control proceeds to a step 4 in which the first cooling mode is selected, whereas if the operating point of the motor 1 is within the second operational region, then the flow of control proceeds to a step 5 in which the second cooling mode is selected. Then in a step 6, according to the result of selection of cooling mode, along with outputting a command to the fan drive device 21 for the fan 4 to be operated in the first cooling mode or in the second cooling mode, also a command is outputted to the pump drive device 22 for the pump 5 to be operated in the first cooling mode or in the second cooling mode.

If a control method based upon conventional thinking were to be applied, then the motor 1 and the inverter device 2 would be cooled at a uniform high cooling capacity over the broad operational region surrounded by the maximum torque line and the highest output line shown in FIG. 4(a). With this type of cooling, the physical structures of the motor 1 and the inverter device 2 come to be determined by taking, as a condition, that they should be able to deal with continuous maximum torque on the maximum torque line and highest output on the highest output line over a long time interval. Due to this, the physical structures of the motor 1 and the inverter device 2 become larger than their physical structures that would correspond to the small torque and output employed during the steady travel described above. By contrast, with the first embodiment of the present invention, the operational region of the motor 1 is divided into the first operational region in which the above described small torque and output during steady travel are generated, and the second operational region in which a large torque and output are generated during heavy load such as during starting off of the electric vehicle from rest, during acceleration, during ascent of a slope, or the like. If the operational region of the motor 1 is the second operational region, then devices for supercooling by the pump 5 and the fan 4 and so on are controlled so that cooling is performed at a higher cooling capacity than the cooling capacity in the first operational region. By doing this, it becomes unnecessary to determine the physical structures of the motor 1 and the inverter device 2 on the basis of the second torque line and the second output line (refer to FIG. 4(*b*)) corresponding to the maximum torque line and the highest output line in FIG. 4(*a*). Rather, it is possible to determine the physical structures of the motor 1 and the inverter device 2 on the basis of the first torque line and the first output line of the first output region that are smaller than the second torque line and the second output line. Due to this, it is possible to make the physical structures of the motor 1 and the inverter device 2 smaller than in the case in which the conventional manner of thinking is employed.

Furthermore, according to the cooling system for an electric vehicle of this first embodiment, it is possible to operate the motor 1 in an operational region in which the efficiency is high. Equal efficiency lines showing the operating efficiency of the motor are given in the graphs for the characteristic of torque of the motor with respect to rotational speed shown in FIG. 4. If a conventional control method is applied, then, as shown in FIG. 4(*a*), since the physical structure of the motor has been determined on the basis of the maximum torque line and the highest output line, accordingly the operating point in the region of high usage frequency during normal traveling (the region surrounded by the broken line in FIG. 4(*a*)), in other words the operating point of small torque and small output during steady traveling, comes to be in a region where the efficiency is low. By contrast in the first embodiment, as shown in FIG. 4(*b*), the physical structure of the motor 1 is determined on the basis of the first torque line and the first output line during steady traveling. Due to this, the operating point in the region of high usage frequency during normal traveling (the region surrounded by the broken line in FIG. 4(*b*)), in other words the operating point of small torque and small output during steady traveling, comes to be in a region where the efficiency is higher than in the case of application of the conventional control method. In other words, according to this first embodiment, it is possible to operate the motor 1 at higher efficiency than in the prior art, and it is possible to reduce its consumption of electrical power.

Moreover, in this first embodiment, the cooling capacity provided by the fan 4 and the pump 5 when the motor is operating in the second operational region in which high torque and output are required is made to be greater than the cooling capacity provided by the fan 4 and the pump 5 when the motor is operating in the first operational region in which small torque and output are required, i.e. during steady traveling. Accordingly, it is possible to make more compact the physical structures of the fan 4 and the pump 5 and also the physical structures of their drive devices 21 and 22, and also to reduce their consumption of electrical power.

Figure 8:
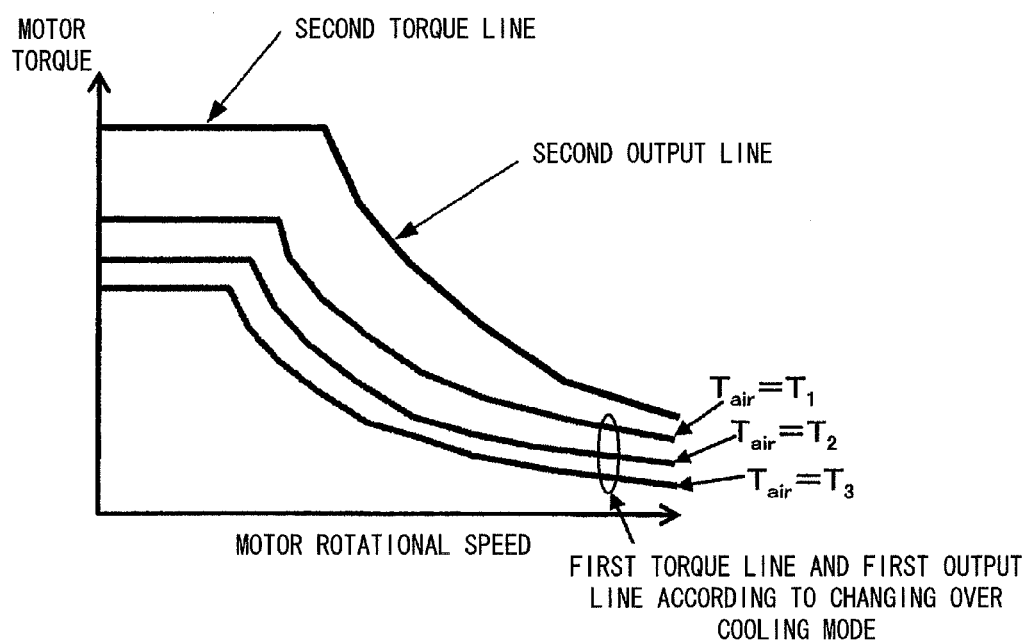
FIG. 8 is a figure showing the way in which the boundary line between the first operational region and the second operational region changes according to the external air temperature.

Now, the cooling capacity of the cooling system changes, not only with the method of operation of the fan 4 and the pump 5, but also with the temperature of the air with which heat exchange with the cooling medium is performed in the radiator 3, and this cooling capacity becomes lower as the air temperature becomes higher. In other words, the cooling capacity is inversely proportional to the air temperature. Accordingly, as shown in FIG. 4(*b*), it is desirable for the boundary line between the first operational region and the second operational region where changeover is performed between the first cooling mode and the second cooling mode, in other words the first torque line and the first output line, to be changed according to the air temperature, in other words according to the external air temperature Tair, as shown in FIG. 8. In other words, in order to compensate for the decrease of the cooling capacity that accompanies the elevation of the external air temperature, the torque on the first torque line and the output on the first output line are brought lower as the external air temperature Tair rises through T1, T2, and T3 (T1<T2<T3), so that changing over to the second cooling mode is made easier as the external air temperature Tair becomes higher and the cooling capacity becomes lower. It should be understood that the external air temperature Tair is detected by an external air temperature sensor 31 shown in FIG. 1, as being the temperature of the air that is being blown through the radiator 3.

Figure 9:
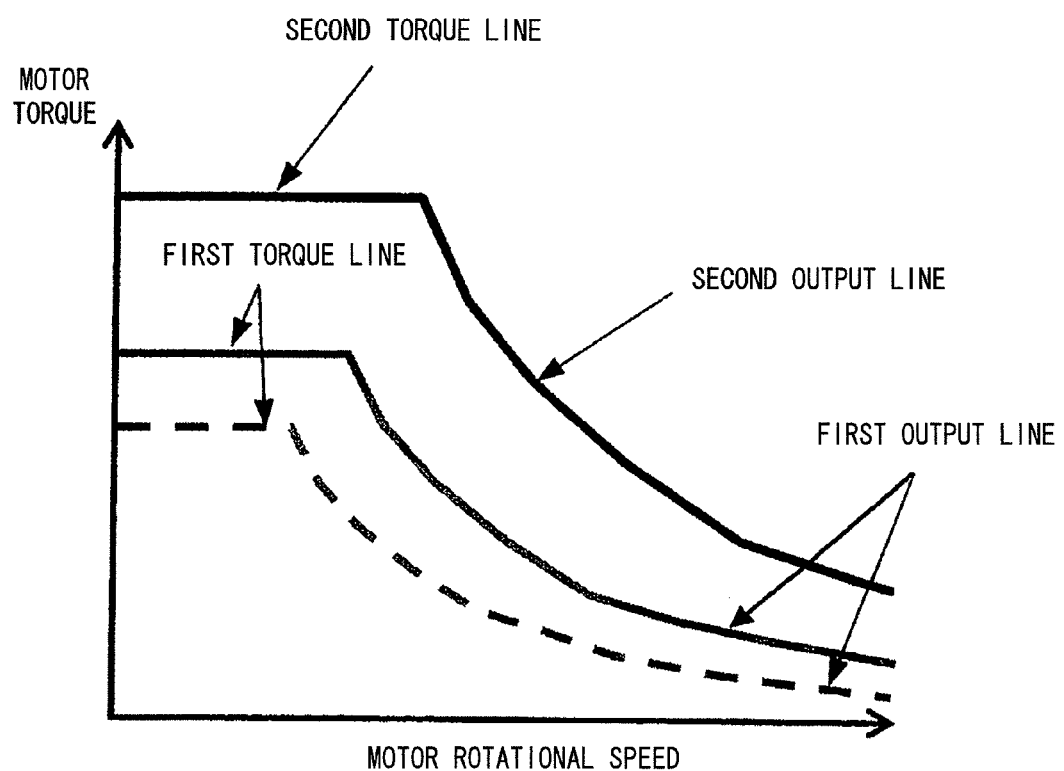
FIG. 9 is a figure for explanation of a method for preventing changeover hunting between the first operational region and the second operational region.

Moreover, in order to prevent hunting during changing over between the first cooling mode and the second cooling mode, it would also be acceptable, as shown in FIG. 9, to arrange to set two boundary lines between the first operational region and the second operational region, in other words two first torque lines and two first output lines. In FIG. 9, the two first torque lines and the two first output lines are shown by the solid line and the broken line. In this case, changing over from the first operational region to the second operational region is determined by the first torque line and the first output line shown by the solid line, while changing over from the second operational region to the first operational region is determined by the first torque line and the first output line shown by the broken line. Or moreover it would also be acceptable, while providing just one first torque line and one first output line, to perform the following type of prevention processing in order to prevent hunting during the changing over between the first cooling mode and the second cooling mode. In this prevention processing, after having changed over from the first cooling mode to the second cooling mode, even if changing over from the second operational region to the first operational region becomes required, such changing over is prevented during a predetermined time interval.

Since in FIG. 4(*b*), as described above, in the region in which the rotational speed of the motor 1 is high, the output is used at a constant output limited to the highest output or less, accordingly the torque that is generated comes to be reduced according to increase of the rotational speed. Moreover, as described above, there is a mutual correlation relationship between the highest output of the motor 1 and the cooling capacity. Under a constant cooling capacity, the heat generation amount of the motor itself is determined so that the motor 1 is kept at or below its upper limit temperature, and the maximum torque and the highest output of the motor 1 are determined so that this amount of generated heat is generated. Since the amount of heat generated increases when the rotational speed of the motor 1 increases, accordingly, if the cooling capacity for keeping the motor 1 at or below its upper limit temperature is fixed, as shown in FIG. 4(*b*), the torque decreases according to the maximum torque or according to the highest output along with the rotational speed of the motor 1 becoming higher. To put this in another manner, when the rotational speed of the motor 1 is low, it is possible further greatly to increase the maximum torque and the highest output of the motor 1 by raising the cooling capacity.

FIG. 10 shows the relationship between the output of the motor 1 and its rotational speed, and the relationship between the cooling capacity and the rotational speed of the motor 1. As shown in FIG. 10(*b*), when cooling capacity is being implemented in the second cooling mode, this implies a cooling capacity in the region in which the rotational speed of the motor is low. By doing this, as shown in FIG. 10(*a*), it is possible to obtain a higher motor output in the region in which the rotational speed of the motor 1 is low. As shown in FIG.

10(*b*), the cooling capacity attains its maximum value at the rotational speed N0 in which the rotational speed of the motor 1 is in the low speed region. The implementation of cooling capacity according to the second cooling mode depends upon the rotational speed of the motor 1. For this, in concrete terms, the cooling capacity is controlled by the control device 23 controlling the fan drive device 21 and the pump drive device 22 on the basis of rotational speed information (not shown in the figures) for the motor 1 inputted to the control device 23 shown in FIG. 1.

Figure 11:
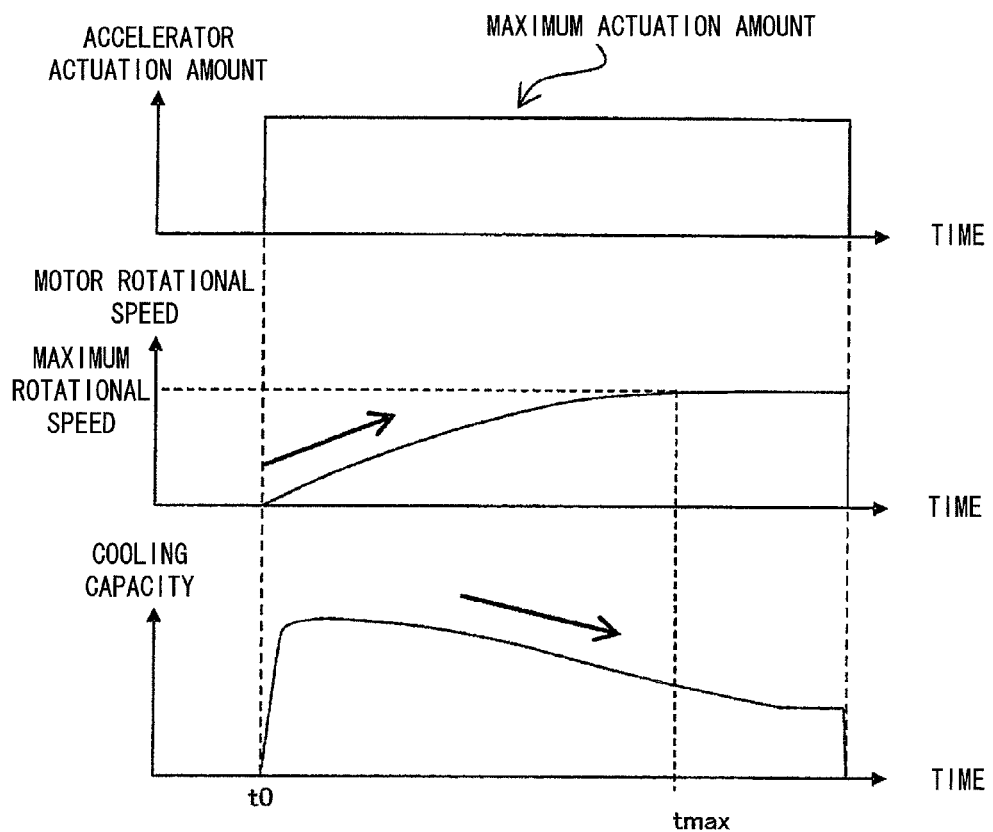
FIG. 11 is a figure showing the change with elapsed time of accelerator actuation amount, the change with elapsed time of the rotational speed of the motor along with change with elapsed time of the accelerator actuation amount, and the change with elapsed time of the cooling capacity of the motor according to change with elapsed time of the rotational speed of the motor.

FIG. 11 is a figure showing the change with elapsed time of the accelerator actuation amount, the change with elapsed time of the rotational speed of the motor 1 that accompanies this change with elapsed time of the accelerator actuation amount, and the change with elapsed time of the cooling capacity for the motor 1 and the inverter device 2 according to this change with elapsed time of the rotational speed of the motor 1. At the time point t0 the accelerator actuation amount changes to a predetermined value, and is then held constant. When this is done, the rotational speed of the motor 1 is gradually increased while maintaining the highest output so as to arrive at the maximum rotational speed at the time point tmax, and subsequently is held constant. At this time, the cooling capacity for the motor 1 and the inverter device 2 increases rapidly in the region in which the rotational speed of the motor 1 is low so as to arrive at a maximum value, and then gradually decreases along with further increase of the rotational speed of the motor 1.

By doing this, and by raising the cooling capacity when the rotational speed of the motor 1 is low, it is possible further greatly to increase the maximum torque and the highest output of the motor 1. As described above, the amount of heat generated increases when the rotational speed of the motor 1 becomes high. If the cooling capacity for keeping the motor 1 at or below its upper limit temperature is fixed, then, as shown in FIG. 4(*b*), the torque decreases according to the maximum torque or the highest output along with the rotational speed of the motor 1 becoming higher. However, if the amount of heat generated is reduced by setting the highest efficiency point of the operating efficiency of the motor 1 in the region in which the rotational speed of the motor 1 is high, then it is possible to obtain higher motor output in the region in which the rotational speed of the motor 1 is high. In concrete terms, the amount of heat that is generated in the motor 1 is reduced by arranging to position the region in which the operating efficiency of the motor 1 shown in FIG. 4(*b*) is high in the region in which the rotational speed of the motor 1 is high. By the region in which the rotational speed of the motor 1 is high is meant, for example, the region in which the rotational speed of the motor 1 is sufficiently higher than the rotational speed N0 of the motor 1 that gives the maximum value for the cooling capacity shown in FIG. 10(*b*).

Figure 12:
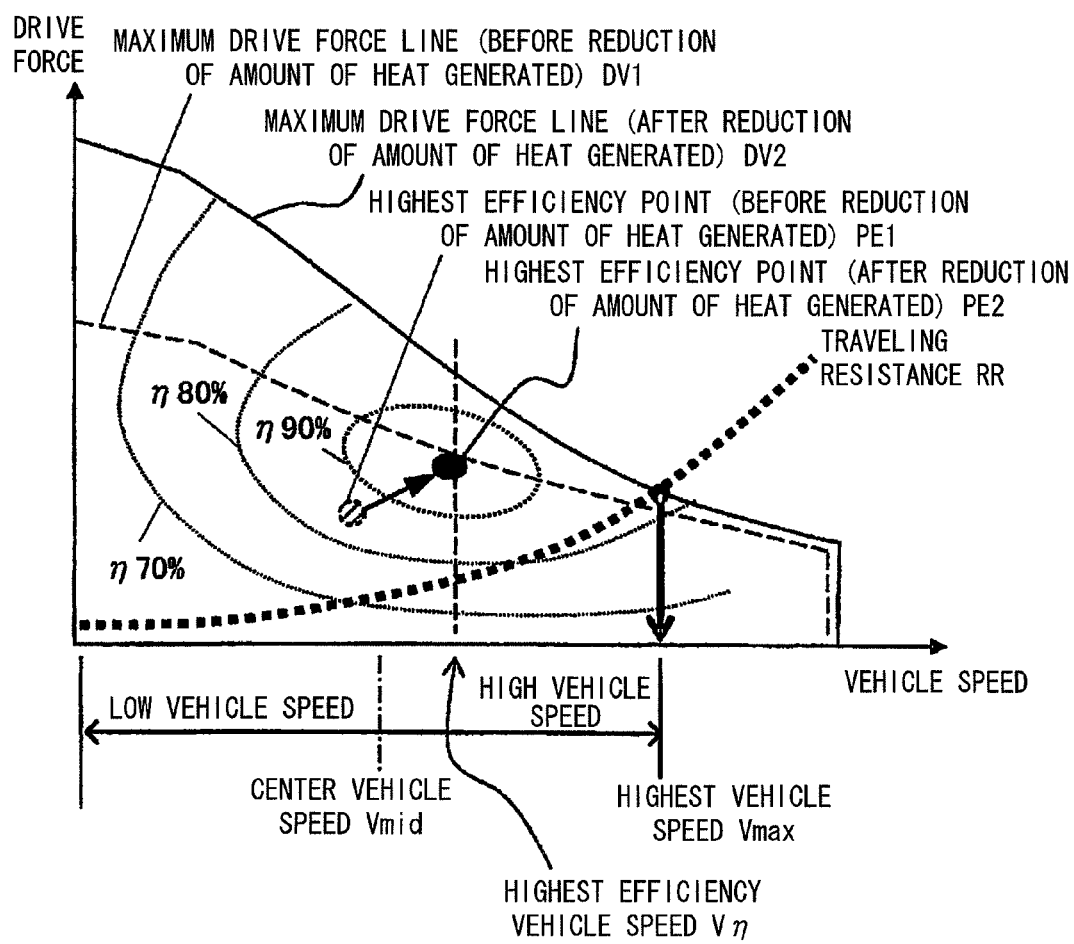
FIG. 12 is a figure showing an example in which a region in which the operating efficiency of the motor is high is positioned in a higher region of the motor operating speed.

FIG. 12 is a figure showing an example in which the region in which the operating efficiency of the motor 1 is high is positioned in a higher region of the rotational speed of the motor 1. Under the preliminary assumption that the speed change ratio of the electric automobile to which the cooling system for an electric vehicle according to the present invention is applied is fixed, when FIG. 12 is compared with FIG. 4(*a*), the quantity shown upon the vertical axis is changed from the torque of the motor 1 to the force for driving the vehicle, and the quantity shown on the horizontal axis is changed from the rotational speed of the motor 1 to the vehicle speed. Moreover, the maximum torque line and the maximum output line in FIG. 4(*a*) are shown together in FIG. 12 as maximum drive force lines DV1 and DV2. The maximum drive force line when the region in which the operating efficiency of the motor 1 is high is positioned in the high vehicle speed region is shown by the solid line DV2, and the highest efficiency point is shown by the circle PE2, whose interior is filled. And the maximum drive force line when the region in which the operating efficiency of the motor 1 is high is not positioned in the high vehicle speed region is shown by the broken line DV1, and the highest efficiency point is shown by the circle PE1 delimited by the broken line, whose interior is hatched.

By positioning the highest efficiency point of the operating efficiency of the motor 1 towards the high vehicle speed side, it is possible to reduce the amount of heat generated by the motor 1, and to provide the maximum drive force on the high vehicle speed side. And it is possible to position the highest efficiency point of the operating efficiency of the motor 1 towards the high vehicle speed side by setting the above described fixed speed change ratio to an appropriate set value. Here the highest vehicle speed, that is obtained as the vehicle speed at the point of intersection of the thick broken line RR that shows the vehicle speed resistance and the maximum drive force line DV2, is termed Vmax, and the center vehicle speed at ½ of this highest vehicle speed Vmax is termed Vmid. The set value for the speed change ratio is determined so that the highest efficiency point of the operating efficiency of the motor 1 becomes, for example, a position that gives a highest efficiency vehicle speed $V\eta$ that is higher than the center vehicle speed Vmid. A high maximum drive force on the high vehicle speed side is obtained by setting the speed change ratio to the appropriate set value in this manner. It should be understood that, on the low vehicle speed side where the vehicle speed is less than or equal to the center vehicle speed Vmid, as described above, it is possible further greatly to increase the maximum torque and the highest output of the motor 1, in other words the maximum drive force line DV2, by raising the cooling capacity as compared to the high vehicle speed side.

As described above, by raising the cooling capacity when the rotational speed of the motor 1 is low, it is possible further greatly to increase the maximum torque and the highest output of the motor 1; but, if it is excessively increased, then the amount of heat generated by the motor 1 is increased by too great an extent, and this is not desirable. Conversely, if the amount of increase of the maximum torque and the highest output of the motor 1 is too small, then this is likewise not desirable, in consideration of the traveling resistance. The magnitude of the torque at the highest efficiency point of the operating efficiency of the motor 1 will now be explained in the following with reference to FIG. 13.

Figure 13:
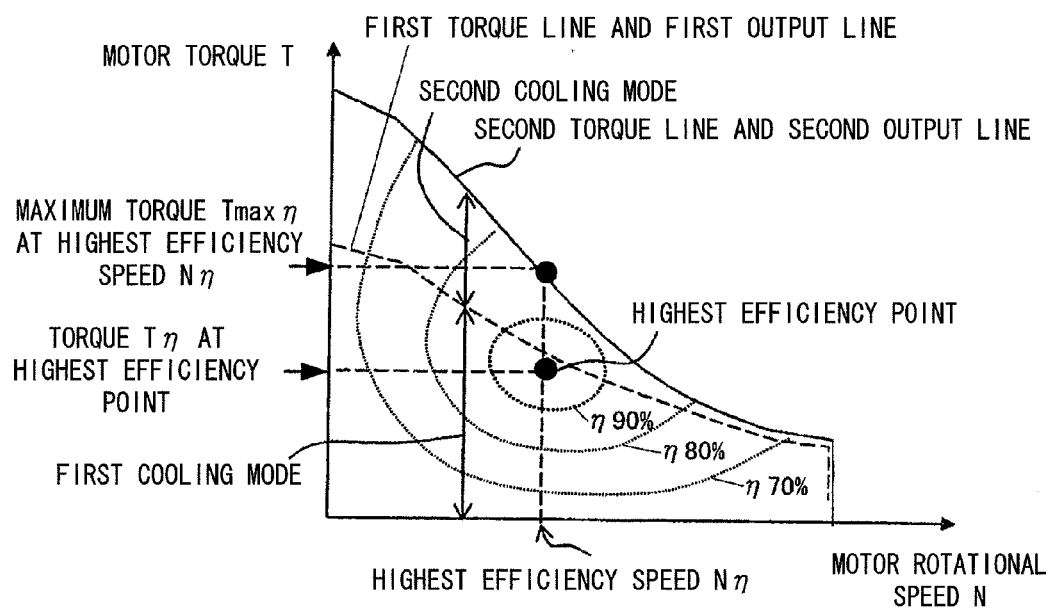
FIG. 13 is a figure showing an example in which the torque at the highest efficiency point of the operating efficiency of the motor is at an intermediate level torque.

FIG. 13 shows the torque characteristic of the motor 1 with respect to its rotational speed in a similar manner to FIG. 4(*b*), and is a figure showing an example in which the highest efficiency point of the operating efficiency of the motor 1 is where the torque attains an intermediate level. It is supposed that the torque and the rotational speed at the highest efficiency point of the operating efficiency of the motor 1 are respectively $T\eta$ and $N\eta$. The rotational speed $N\eta$ at the highest efficiency point of the operating efficiency of the motor 1 is termed the highest efficiency speed $N\eta$. The maximum torque $Tmax\eta$ at the highest efficiency speed $N\eta$ in the second cooling mode in which the cooling capacity has been increased is obtained as the motor torque on the second torque line and the second output line at the highest efficiency speed $N\eta$. At this time, the torque $T\eta$ at the highest efficiency point becomes a medium torque with respect to this maximum torque $Tmax\eta$. In concrete terms, it is desirable for this torque $T\eta$ at the highest efficiency point to be within the range of 50% to 75% of the maximum torque $Tmax\eta$.

—Second Embodiment—

Figure 14:
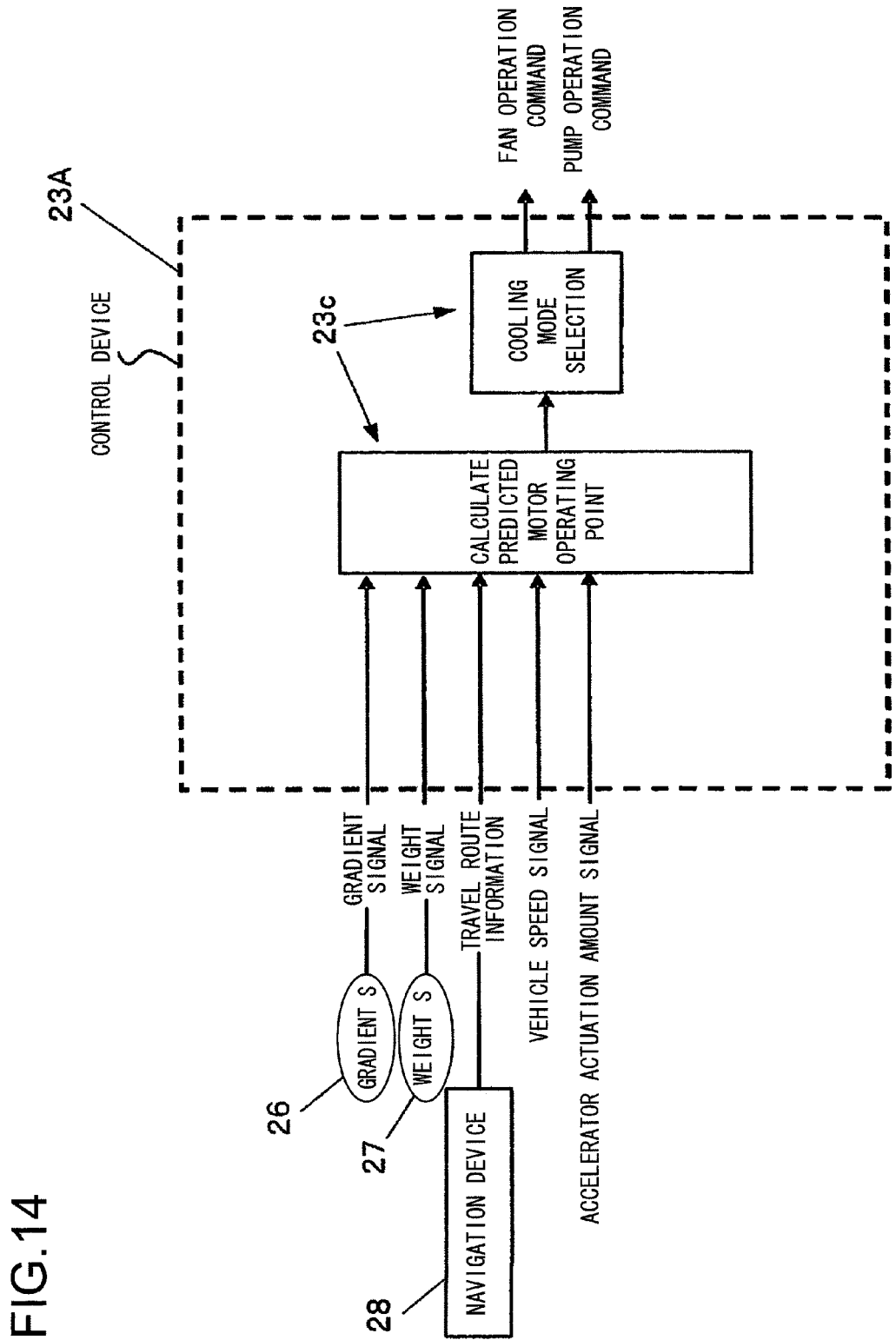
FIG. 14 is a block diagram showing cooling mode selection control in a second embodiment.

In the explanation of the first embodiment described above an example was shown in which the operating point of the motor 1 was calculated in real time, and the operational region of the motor 1 was determined and the cooling mode was changed over, on the basis of the vehicle speed signal and the signal representing the accelerator actuation amount. Next, a second embodiment will be explained in which it is arranged to forecast the operating point of the motor 1 in advance, and to determine the operational region of the motor 1 and to change over the cooling mode according to the operating point that is the result of this forecasting. FIG. 14 is a block diagram showing the cooling mode selection control in this second embodiment. It should be understood that, apart from the cooling mode selection control, this second embodiment is the same as the first embodiment described above, and accordingly some explanation will be omitted.

In this second embodiment, apart from the vehicle speed sensor 24 and the accelerator sensor 25 shown in FIG. 1, a gradient sensor 26 that detects the road gradient, a vehicle weight sensor 27 that detects the weight of the vehicle, and a navigation device 28 that calculates travel route information are also connected to the control device 23A. The navigation device 28 includes a GPS receiver, a VICS receiver, a road map data storage device and so on (none of which are shown in the figures), and, along with finding an optimum path from the current position of the vehicle to a destination, in other words a recommended path, also detects the gradient of the road along the recommended path, the average vehicle speed, the state of congestion and so on. The control device 23A forecasts the operating point of the motor 1 and determines the operational region of the motor 1 upon the recommended path to the destination by calculating the torque and the rotational speed on the basis of the recommended path information, the gradient information, the average vehicle speed information, and the congestion information inputted from the navigation device 28, and also on the basis of the vehicle weight inputted from the vehicle weight sensor 27 and so on. And the operational regions of the motor 1 upon the roads on this recommended path are stored in the memory 23m of the control device 23A (refer to FIG. 1).

Figure 15:
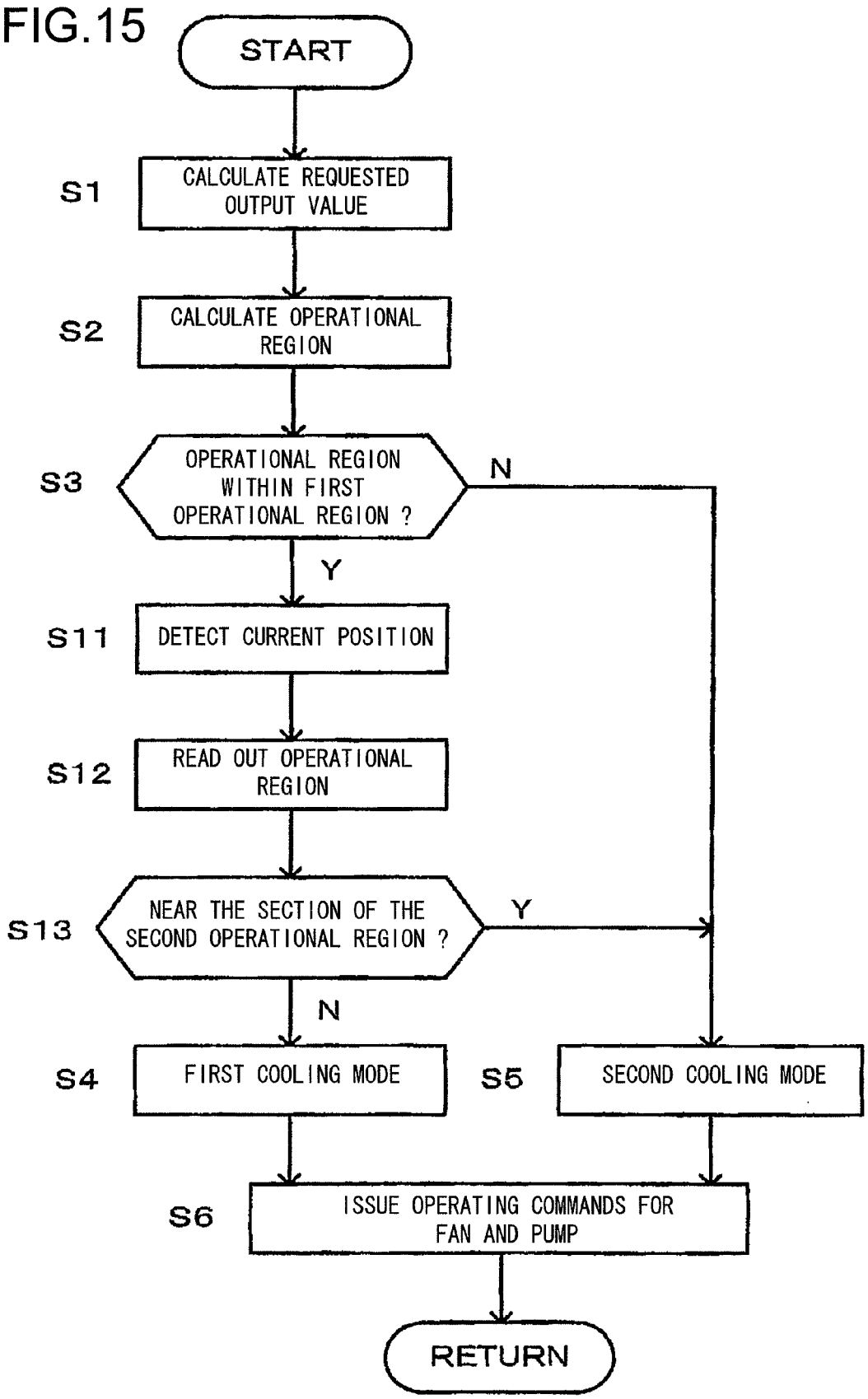
FIG. 15 is a flow chart showing a cooling mode selection control program of the second embodiment.

FIG. 15 is a flow chart showing the cooling mode selection program of this second embodiment. The CPU 23c of the control device 23A repeatedly executes this cooling mode selection control program shown in FIG. 15 while an ignition switch (not shown in the figures) is ON. It should be understood that the same step numbers are appended to control steps that are the same as ones in the first embodiment shown in FIG. 7, and that the explanation will concentrate upon the points of difference. As described above, in the steps 1 through 3, a requested output value for the motor 1 is calculated on the basis of the vehicle speed signal and the signal that specifies the amount of actuation of the accelerator, and, according to the vehicle speed and the accelerator actuation amount, a decision is made as to whether the operating point of the motor 1 is within the first operational region or is within the second operational region. If it is decided that the operating point is within the first operational region then the flow of control proceeds to a step 11, whereas if it is decided that the operating point is within the second operational region then the flow of control proceeds to a step 5.

If it is decided that the operating point of the motor 1 that has been calculated on the basis of the speed and the accelerator actuation amount of the electric vehicle is within the first operational region, then in the step 11 the current position of the electric vehicle is detected by the navigation device 28. Next in a step 12 the operational region around the current position is read out from the memory 23m. And in a step 13 it is determined whether or not a section for the second operational region is close by. For example, it may be determined whether or not there is any road section for the second operational region within a predetermined distance ahead along the recommended path from the current position of the electric vehicle, and if a road section for the second operational region is present within the predetermined distance ahead, then the flow of control proceeds to the step 5, whereas if there is no such road section then the flow of control proceeds to the step 4.

If it has been decided that the operating point of the motor 1 that has been calculated on the basis of the speed and the accelerator actuation amount of the electric vehicle is within the first operational region, and moreover that there is no road section for the second operational region within the predetermined distance upon the recommended path, then the first cooling mode is selected in the step 4. On the other hand, if it has been decided that the operating point of the motor 1 that has been calculated on the basis of the speed and the accelerator actuation amount of the electric vehicle is not within the first operational region, in other words that it is within the second operational region, then the second cooling mode is selected in the step 5. Or if, even though it has been decided that the operational region of the motor 1 at its current position is within the first operational region, there is some road section for the second operational region nearby within the predetermined distance ahead along the recommended path, then the second cooling mode is selected in the step 5. And in a step 6, according to the result of selection of the cooling mode, along with outputting an operation command for either the first cooling mode or the second cooling mode to the fan drive device 21 for the fan 4, also an operation command for either the first cooling mode or the second cooling mode is outputted to the pump drive device 22 for the pump 5.

According to this second embodiment, the operational region of the motor 1 on the road to the destination is forecast in advance. If it is forecast that the motor 1 and the inverter device 2 will operate in the second operational region in which the amount of heat that is generated is large, then it is possible to change over from the first cooling mode to the second cooling mode in which the cooling capacity is high a predetermined distance before the road section for the second operational region. Due to this, it is possible to keep elevation of the temperatures of the motor 1 and the inverter device 2 in the road section for the second operational region to temperatures that are lower than their upper limit temperatures. To put it in another manner, a clearance can be established before these temperatures arrive at the upper limit temperatures, and it is possible to set the short time interval over which the maximum torque and the highest output shown in FIG. 4(*b*) are kept upon the second torque line and the second output line to a larger value.

—Third Embodiment—

Figure 16:
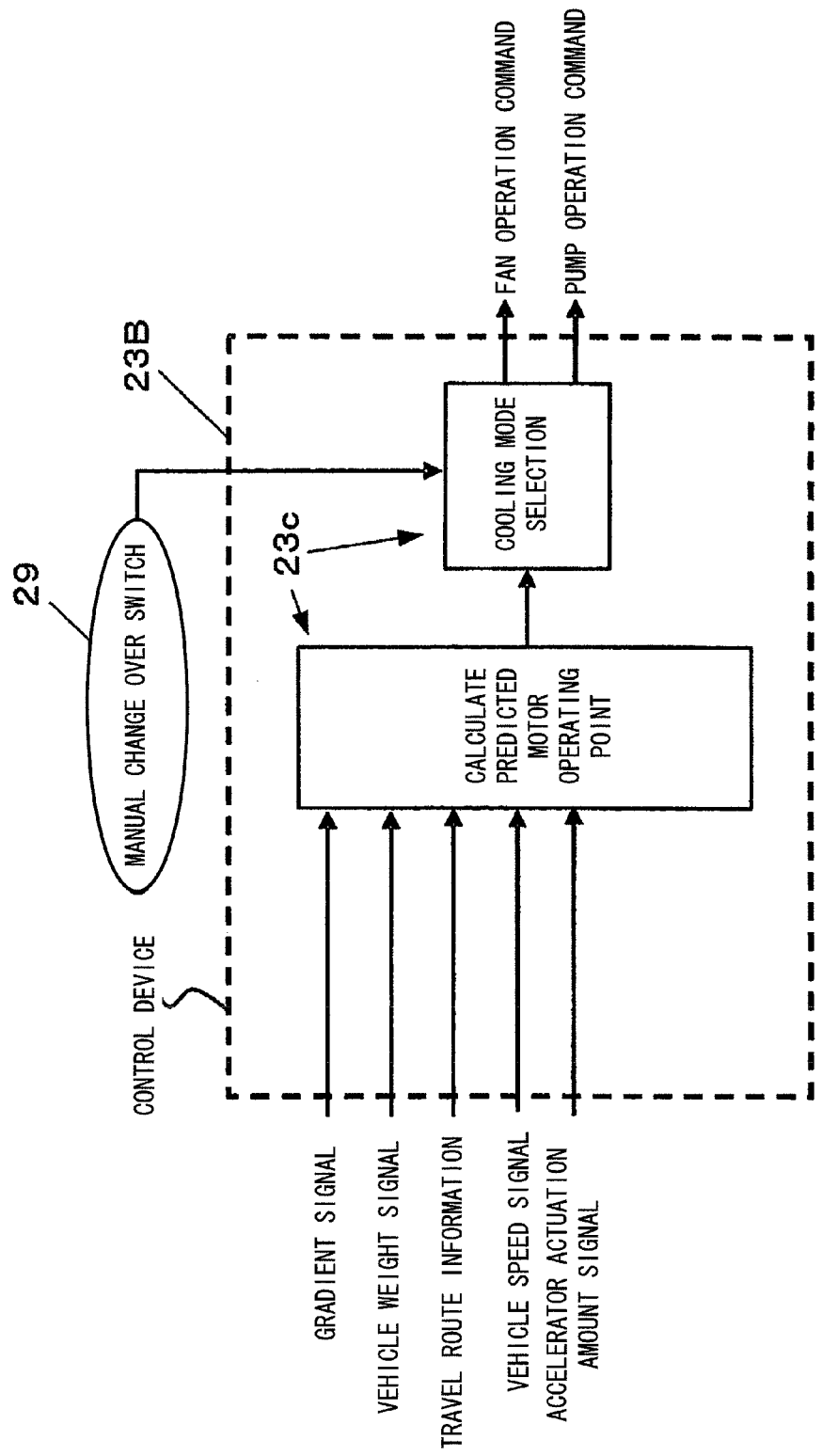
FIG. 16 is a block diagram showing cooling mode selection control in a third embodiment.

A third embodiment will now be explained, in which a manual cooling mode selection function is added to the first and second embodiments described above. FIG. 16 is a block diagram showing the cooling mode selection control in this third embodiment. In this third embodiment, a manual changeover switch 29 is also connected to the control device 23B, in addition to the structure of the second embodiment shown in FIG. 14. This manual changeover switch 29 is a switch for the driver of the electric vehicle to select the cooling mode manually.

Figure 17:
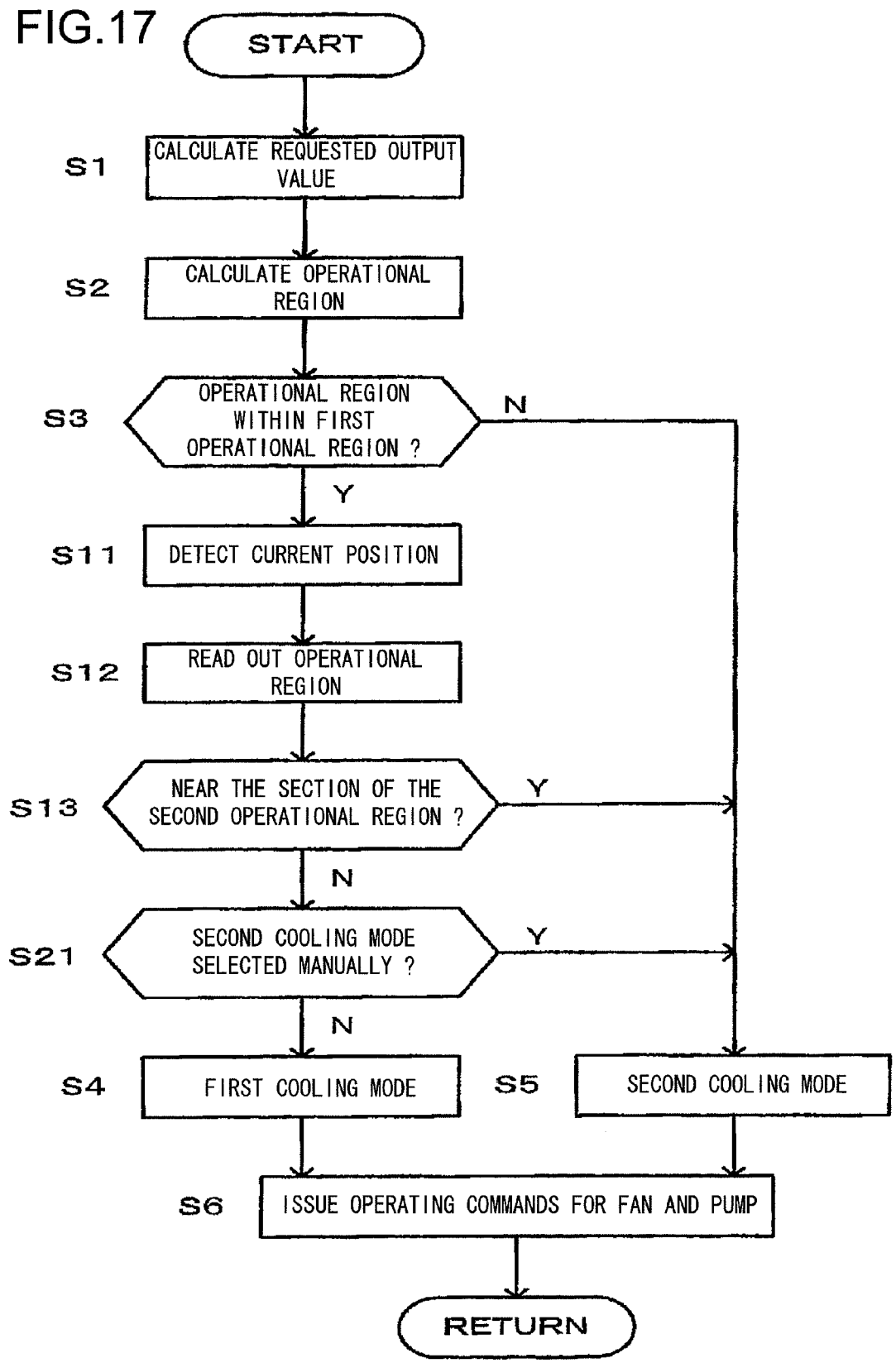
FIG. 17 is a flow chart showing a cooling mode selection control program of the third embodiment.

FIG. 17 is a flow chart showing the cooling mode selection program of this third embodiment. The CPU 23c of the control device 23A repeatedly executes this cooling mode selection control program shown in FIG. 17 while an ignition switch (not shown in the figures) is ON. It should be understood that the same step numbers are appended to control steps that are the same as ones in the first embodiment shown in FIG. 7 and in the second embodiment shown in FIG. 15. As described above, in steps 1 through 3, a requested output value for the motor 1 is calculated on the basis of the vehicle speed signal and the signal that specifies the amount of actuation of the accelerator, and, according to the vehicle speed and the accelerator actuation amount, a decision is made as to whether the operating point of the motor 1 is within the first operational region or is within the second operational region. If it is decided that the operating point is within the first operational region then the flow of control proceeds to a step 11, whereas if it is decided that the operating point is within the second operational region then the flow of control proceeds to a step 5.

If it is decided that the operating point of the motor 1 that has been calculated on the basis of the speed and the accelerator actuation amount of the electric vehicle is within the first operational region, then, along with the current position of the electric vehicle being detected in the step 11, in a step 12 the operational region around the current position is read out from the memory 23m, and in a step 13 it is determined whether or not a section for the second operational region is close by. If a road section for the second operational region is present within the predetermined distance ahead, then the flow of control proceeds to the step 5, whereas if there is no such road section then the flow of control proceeds to a step 21.

In the step 21, it is the case that it has been decided that the operating point of the motor 1 calculated on the basis of the speed and the accelerator actuation amount of the electric vehicle is within the first operational region, and moreover that there is no road section for the second operational region present within the predetermined distance ahead upon the recommended path. In this step 21, it is determined whether or not the second cooling mode is being selected with the manual changeover switch 29, and, if the second cooling mode is being selected manually, then the flow of control is transferred to the step 5, whereas if the first cooling mode is being selected then the flow of control is transferred to the step 4. Thus, if it is determined by the control device 23B that the operating point of the motor 1 is within the first operational region, and moreover there is no road section for the second operational region present within the predetermined distance ahead from the current position, and moreover the first cooling mode is being selected, then the first cooling mode is selected in the step 4.

On the other hand, if it has been decided that the operating point of the motor 1 calculated on the basis of the speed and the accelerator actuation amount of the electric vehicle is not within the first operational region, in other words that it is within the second operational region, then the second cooling mode is selected in the step 5. Or if, even though it has been decided that at the current position the operational region of the motor 1 is within the first operational region, there is some road section for the second operational region present within the predetermined distance ahead upon the recommended path, then the second cooling mode is selected in the step 5. Or, if the second cooling mode has been selected manually, then the second cooling mode is selected in the step 5. Then in the step 6, according to the result of selection of the cooling mode, along with outputting an operation command for either the first cooling mode or the second cooling mode to the fan drive device 21 for the fan 4, also an operation command for either the first cooling mode or the second cooling mode is outputted to the pump drive device 22 for the pump 5.

According to this third embodiment, if the second cooling mode has been manually selected by the driver, then the second cooling mode is selected, irrespective of the result of determination of the cooling mode by the control device 23B. And if both the result of manual selection of the cooling mode and also the result of determination of the cooling mode by the control device 23B are the first cooling mode, then the first cooling mode is selected. Accordingly, if the driver of the electric vehicle thinks that he wishes to raise the cooling capacity due to his own operational preference or due to weather conditions or traveling conditions or the like during operation, then it is possible for cooling to be performed in the second cooling mode in which the cooling capacity is high, thus giving priority to the intention of the driver. Thus, it is possible effectively to integrate the manual selection function into the function of the first and the second embodiments for automatically selecting the cooling mode.

—Fourth Embodiment—

Figure 18:
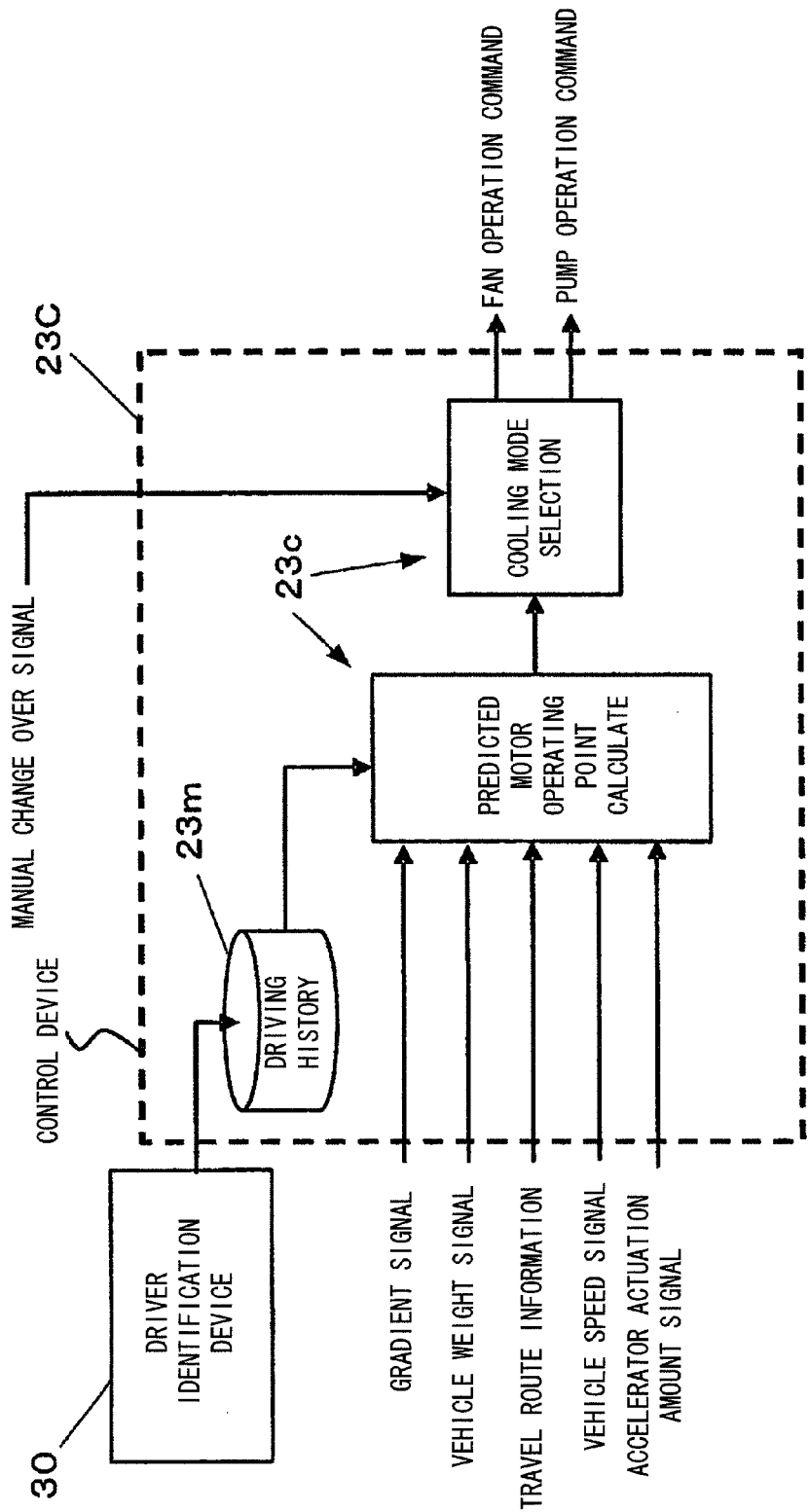
FIG. 18 is a block diagram showing cooling mode selection control in a fourth embodiment.

A fourth embodiment will now be explained, in which it is arranged to change the boundary line between the first operational region and the second operational region for changing over between the first cooling mode and the second cooling mode, in other words the first torque line and the second torque line (refer to FIG. 4(b)), according to the driving history of each driver of the electric vehicle. FIG. 18 is a block diagram showing the cooling mode selection control in this fourth embodiment. In this fourth embodiment, in addition to the structure of the third embodiment shown in FIG. 16, along with a driver identification device 30 being connected to the control device 23C, also past driving history data for each driver is stored in the memory 23m of the control device 23C. It should be understood that the cooling mode selection control in this fourth embodiment is the same as the cooling mode selection control in the first through the third embodiments described above, and accordingly no flow chart thereof is given, and explanation of the operation thereof is omitted.

The driver identification device 30 identifies the driver who is operating the electric vehicle. Various methods may be consider for the method of identification, such as identifying the driver by reading data on an IC chip that is attached to his driving license, providing a different ignition key for each driver of the electric vehicle in which a different ID is stored and reading this ID, or the like. The memory 23m of the control device 23C stores the driving history for each driver who has been identified. For example, for a driver who has the tendency to demand more acceleration than the average driver, it is necessary to provide higher torque and output than for an average driver, so that the frequency of operation in the second operational region becomes higher. Due to this, the first torque line and the first output line for changing over between the cooling modes are changed towards the low output side, so that it is made easier to select the second cooling mode in which the cooling capacity is high. By doing this, for this driver who demands more acceleration, even if the motor operating point is the same as in the case of an average driver, the range of the second cooling mode in which the cooling capacity is high comes to be enlarged. Thus, it is possible to perform cooling of the motor 1 and the inverter device 2 with a cooling capacity that is matched to the driving characteristics of the driver.

—Fifth Embodiment—

Generally, the efficiencies of a motor and an inverter device change according to their temperatures, and, if the operating point of the motor is the same, in other words if the torque and the rotational speed are the same, then these efficiencies decrease as the temperatures of the motor and the inverter device become greater. Due to this, it is necessary for the cooling capacity to be changed according to the temperatures of the motor and the inverter device. To put this in another manner, it is possible to vary the efficiencies of the motor and the inverter device by changing the cooling capacity, thus changing the temperatures of the motor and the inverter device. In the prior art, even if there was some change of the cooling capacity according to the torque or the output of the motor or the inverter device, or according to their temperatures, control of the cooling capacity was not performed in consideration of change of the efficiency due to temperature.

Now this fifth embodiment will be explained, in which cooling control is performed while taking the efficiencies of auxiliary machinery such as the fan 4 and the pump 5 and so on into account in the operating efficiencies of the motor 1 and the inverter device 2, and while taking into consideration the combination of these efficiencies. It should be understood that, since the loss in the inverter device 2 is small as compared to the loss in the motor 1, accordingly the cooling control in this fifth embodiment will be explained while paying attention only to the temperature and the loss in the motor 1. Moreover, the cooling mode selection control in this fifth embodiment is the same as the cooling mode selection control in the first through the third embodiments described above, and accordingly no flow chart for this operation is given and explanation thereof will be omitted.

Figure 19:
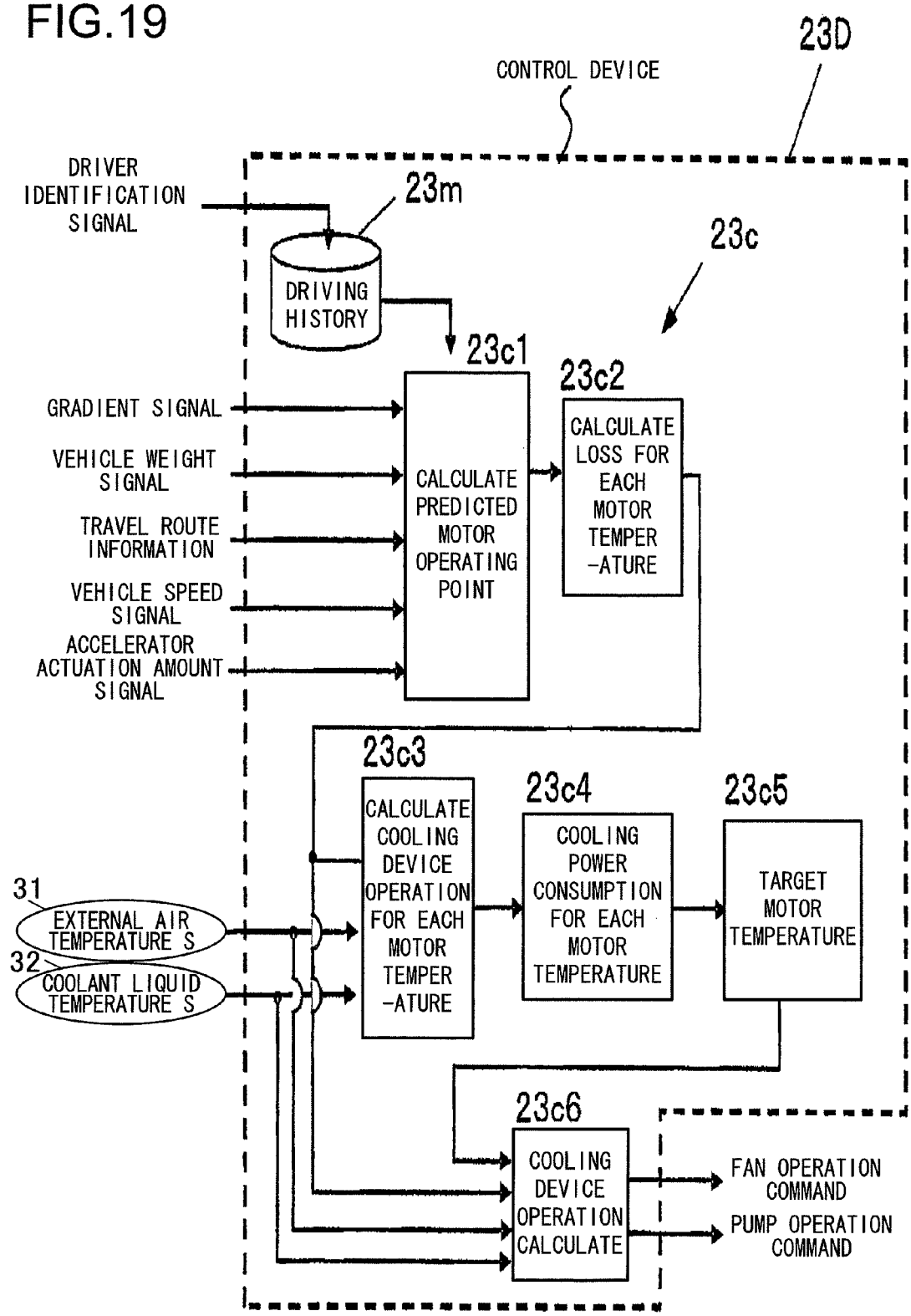
FIG. 19 is a block diagram showing cooling control in a fifth embodiment.

FIG. 19 is a block diagram showing cooling control in the fifth embodiment. In this fifth embodiment, in addition to the structure of the fourth embodiment shown in FIG. 18, along with connecting an external air temperature sensor 31 and a coolant liquid temperature sensor 32 to the control device 23D, also the control device 23D is provided with control blocks 23c1 through 23c6 that are implemented as software for the CPU 23c. The external air temperature sensor 31 detects the temperature of the air external to the electric vehicle, and the coolant liquid temperature sensor 32 detects the temperature of the cooling medium.

In the control block 23c1, as described above, a calculation is performed to forecast the operating point of the motor 1. If the operating point and the temperature of the motor 1 are determined, then the amount of electrical power lost due to copper loss and windage loss and so on in the motor 1 can be obtained, and the amount of heat generated along with this loss of electrical power can be obtained. Thus, in the control block 23c2, the lost electrical power (i.e. the amount of heat generated) due to copper loss and windage loss and so on when the motor 1 is operated at the operating point that is the result of the above calculation is calculated for each motor temperature. Next, in the control block 23c3, the operation of the cooling devices for each motor temperature is calculated. The cooling devices are the fan 4, the pump 5, the fan drive control device 21 for the fan 4, and the pump drive control device 22 for the pump 5. In concrete terms, the speeds of operation of the fan 4 and the pump 5 are calculated for dissipating, to air at the temperature detected by the external air temperature sensor 31, and via a cooling medium at the temperature detected by the coolant liquid temperature sensor 32, the amount of heat generated according to the motor loss electrical power at each motor temperature that is the result of calculation.

Figure 20:
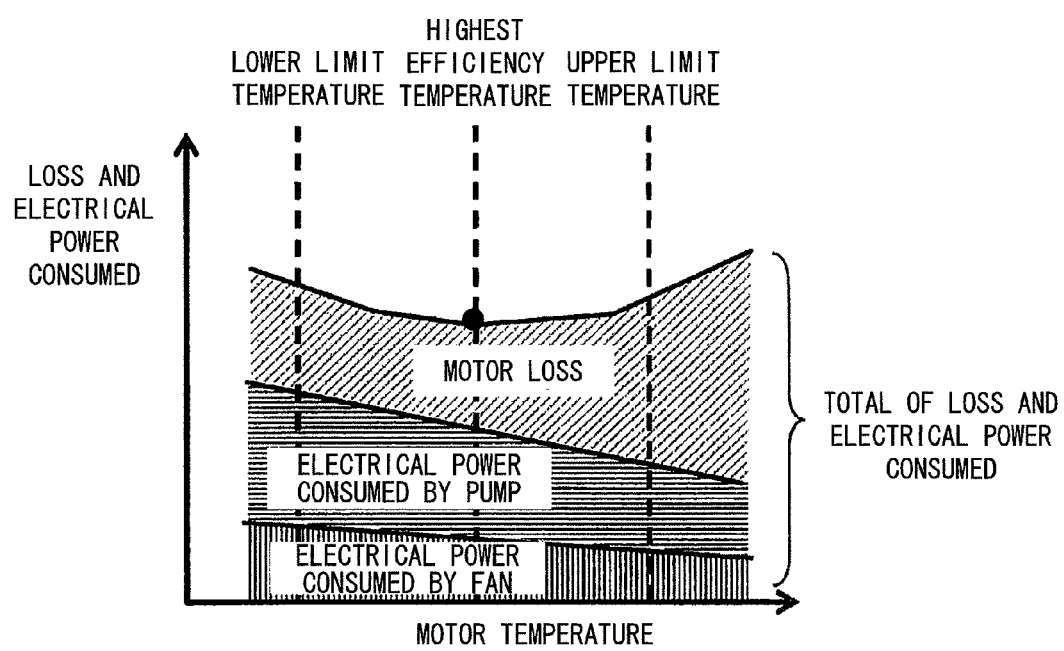
FIG. 20 is a figure for explanation of a motor temperature at which the sum of the motor loss, the electrical power consumed by the pump, and the electrical power consumed by the fan becomes a minimum.

Next, in the control block 23c4, the amounts of electrical power consumed by the fan 4, the pump 5, the fan drive device 21 for the fan 4, and the pump drive device 22 for the pump 5 when the fan 4 and the pump 5 are operated at the operating speeds that are the result of the above calculation are calculated. And, in the control block 23c5, as shown in FIG. 20, a sum total is obtained by adding together, for each motor temperature, the motor loss electrical power, the electrical power consumed by the fan, and the electrical power consumed by the pump. That motor temperature between the lower limit temperature and the upper limit temperature for which this sum total becomes a minimum is taken as being the highest efficiency temperature, and is set as the target motor temperature. Finally, in the control block 23c6, the operating speeds for the cooling devices, in other words the operating speeds for the fan 4 and the pump 5, in order to bring the motor temperature according to the present external air temperature and the present coolant liquid temperature to the target temperature, are calculated, and a fan operation command and a pump operation command are outputted to the fan drive device 21 and to the pump drive device 22.

According to this fifth embodiment, it is possible to operate the motor 1, the inverter device 2, the fan 4, and the pump 5 at a motor temperature at which the combined efficiency becomes higher, while taking into consideration, not only the efficiency of the motor, but also the amounts of electrical power consumed by the cooling devices themselves for performing cooling, and accordingly it is possible to implement energy saving operation. It should be understood that while, in the example described above, the operational states of the cooling devices were determined while paying attention only to the motor losses, it would also be acceptable to arrange to determine the operational states of the cooling devices while taking into consideration the losses in the inverter device 2 and the losses in an electricity storage device (not shown in the figures), in addition to the motor losses.

—Sixth Embodiment—

Figure 21:
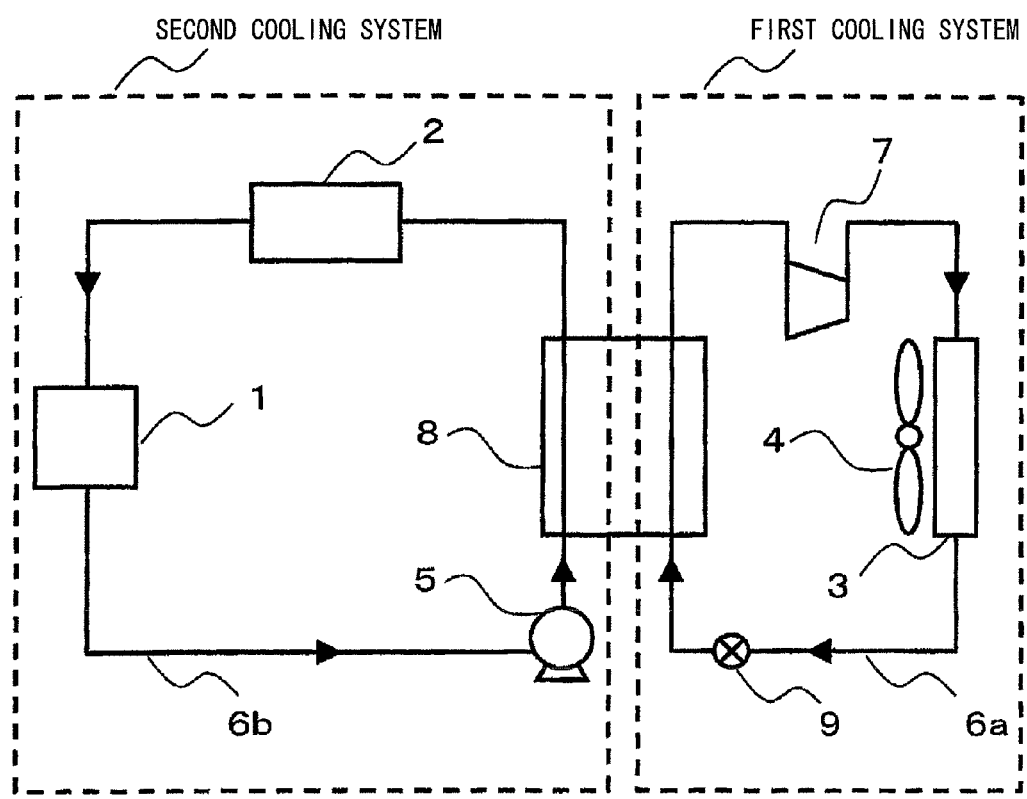
FIG. 21 is a figure showing the structure of a cooling system for an electric vehicle according to a sixth embodiment.

FIG. 21 shows the structure of a cooling system for an electric vehicle in the sixth embodiment. It should be understood that the same reference symbols are appended to elements that are the same as elements shown in FIG. 1, and that the explanation will concentrate upon the points of difference. Moreover, certain elements shown in FIG. 1 such as the fan drive device 21, the pump drive device 22, the control device 23, the vehicle speed sensor 24 and the accelerator sensor 25 connected to the control device 23 and so on are omitted from FIG. 21, and explanation thereof is also omitted. This cooling system for an electric vehicle according to the sixth embodiment is built to incorporate a first cooling system that dissipates heat in a cooling medium to the external air, and a second cooling system that cools the motor 1 and the inverter device 2 by performing heat exchange with this first cooling system via a heat exchanger 8.

First, the second cooling system includes the pump 5, the coolant circulation path 6b, the heat exchanger 8, and the motor 1 and the inverter device 2 that are to be the subjects for cooling, and, in the coolant circulation path 6b, the coolant medium is circulated along the path from the pump 5→the heat exchanger 8→the inverter device 2→the motor 1→back to the pump 5. The cooling medium that has been pressurized by and expelled from the pump 5 is cooled by performing heat exchange with the cooling medium of the first cooling system in the heat exchanger 8, and returns back to the pump 5 again after having cooled the inverter device 2 and the motor 1. Here, while water or oil may be used for as the cooling medium for cooling the motor 1 and the inverter device 2, apart from these, it would also be possible to use an alternative for chlorofluorocarbon such as a hydrofluorocarbon or a hydrochlorofluorocarbon or the like.

Next, the first cooling system includes the radiator 3, the fan 4, the coolant circulation path 6a, a compressor 7, the heat exchanger 8, and an adjustment valve 9, and, in the coolant circulation path 6a, the coolant medium is circulated along the path from the heat exchanger 8→the compressor 7→the radiator 3→the adjustment valve 9→back to the heat exchanger 8. This first cooling system is a refrigeration cycle that employs a coolant for a refrigeration cycle such as HFC-134a or the like as the first cooling medium, and the radiator 3 functions as a condenser while the adjustment valve 9 functions as an expansion valve, while the heat exchanger 8 functions as an evaporator. Having absorbed the heat in the second cooling medium of the second cooling system, the first cooling medium is compressed by the compressor 7, and after having been cooled by the radiator 3 due to the air blown by the fan 4, returns back to the heat exchanger 8 via the adjustment valve 9.

In the first embodiment shown in FIG. 1, it is not possible to lower the temperature of the cooling medium below the temperature of the air that is being blown through the radiator 3 by the fan 4, since the heat in the cooling medium that has cooled the motor 1 and the inverter device 2 that are the subjects for cooling is dissipated by the radiator 3 due to heat exchange with the air. By contrast, in this sixth embodiment, the heat in the second cooling medium of the second cooling system that has cooled the motor 1 and the inverter device 2 that are the subjects for cooling is dissipated by the heat exchanger 8 to the first cooling medium of the first cooling system, and furthermore the heat in the first cooling medium in the first cooling system that employs a refrigeration cycle is dissipated by the radiator 3 to the air. Due to this, it is possible to lower the temperature of the second cooling medium to be below the temperature of the air, so that it is possible to increase the cooling capacity further.

It should be understood that, in this sixth embodiment, in addition to the devices of the cooling system of the first embodiment, there are also provided the compressor 7 and the adjustment valve 9, and these constitute control objects. The operation of this sixth embodiment as a cooling system mounted in an electric vehicle will be described hereinafter.

—Variation of Sixth Embodiment—

Figure 22:
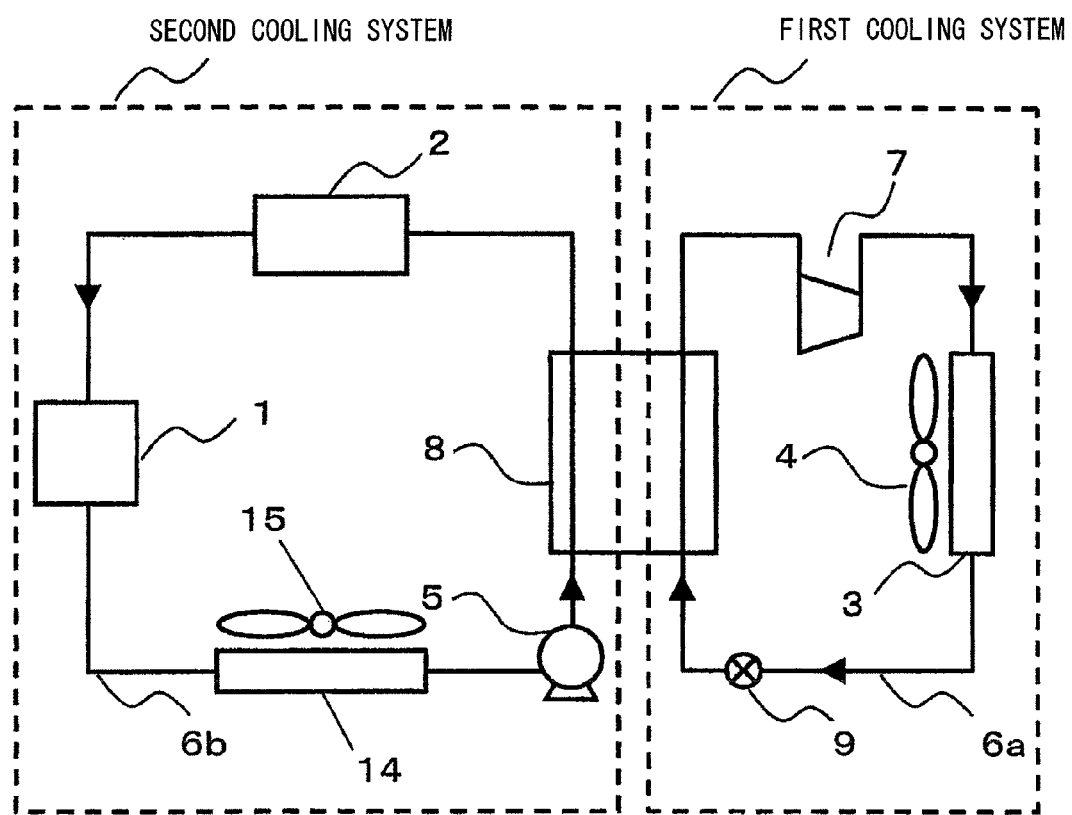
FIG. 22 is a figure showing the structure of a cooling system for an electric vehicle according to a variant of this sixth embodiment.

FIG. 22 shows the structure of a cooling system for an electric vehicle in a variant of the sixth embodiment shown in FIG. 21. It should be understood that the same reference symbols are appended to elements that are the same as elements shown in FIG. 21, and that the explanation will concentrate upon the points of difference. In this variant embodiment, a radiator 14 and a fan 15 are installed between the motor 1 and the pump of the second cooling system. It should be understood that the drive device for the fan 15 is omitted from FIG. 22. If some malfunction takes place in the first cooling system that includes the fan 4, the compressor 7, the adjustment valve 9 and so on, so that the capacity for cooling the motor 1 and the inverter device 2 is reduced, then the heat in the second cooling medium of the second cooling system is dissipated to the air that is being blown through the radiator 14 by the fan 15, so that a cooling capacity of the same order as that in the first embodiment shown in FIG. 1 is still ensured. Due to this, even if a malfunction takes place in the first cooling system, it is still possible to operate the electric vehicle continuously. It should be understood that it would also be acceptable to perform cooling of the second cooling medium with the radiator 14 and the fan 15 in usual circumstances, and not only when a malfunction has occurred in the first cooling system.

—Seventh Embodiment—

Figure 23:
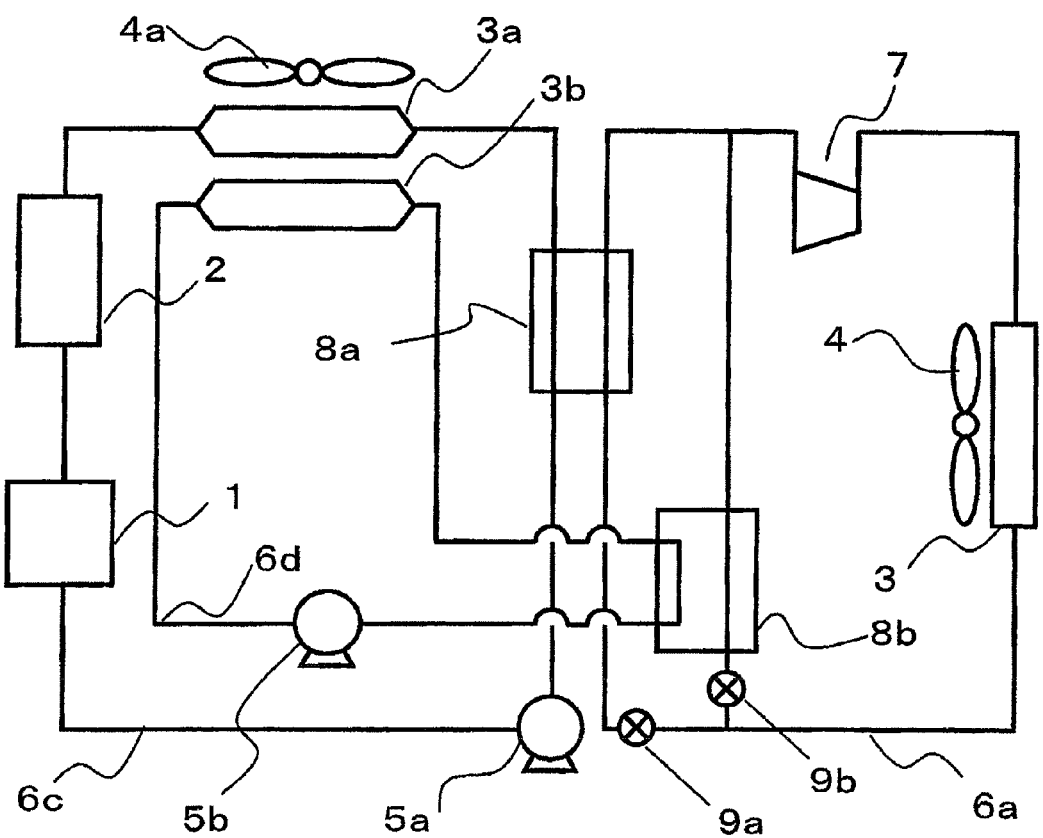
FIG. 23 is a figure showing the structure of a cooling system for an electric vehicle according to a seventh embodiment.

FIG. 23 shows the structure of a cooling system for an electric vehicle in the seventh embodiment. It should be understood that the same reference symbols are appended to elements that are the same as elements shown in FIG. 1 and FIG. 21, and that the explanation will concentrate upon the points of difference. Moreover, certain elements such as the fan drive device 21, the pump drive device 22, the control device 23, the vehicle speed sensor 24 and the accelerator sensor 25 connected to the control device 23 and so on are omitted from FIG. 23, and explanation thereof is also omitted. In this seventh embodiment, by contrast to the sixth embodiment shown in FIG. 21, the second cooling system is divided into two paths: a circulation path 6c for cooling subjects that are to be cooled, and a circulation path 6d for air conditioning the interior of the passenger compartment.

First, on the circulation path 6c that is for cooling the subjects for cooling, after the heat in the second medium that has been pressurized by and expelled from the pump 5a has been dissipated to the first cooling medium of the first cooling system by the heat exchanger 8a, this second medium then cools the interior of the passenger compartment by abstracting heat from the air within the passenger compartment via the radiator 3a due to the air that is blown by the fan 4a. Next, this second medium cools the inverter device 2 and the motor 1 that are the subjects to be cooled by being conducted through them in order. Moreover, on the path 6d that is for air conditioning the interior of the passenger compartment, after the heat in the second medium that has been pressurized by and expelled from the pump 5b has been dissipated to the first cooling medium of the first cooling system by the heat exchanger 8b, this second medium then cools the interior of the passenger compartment by abstracting heat from the air within the passenger compartment via the radiator 3b due to the air that is blown by the fan 4a.

On the other hand, in the first cooling system, the path that performs heat exchange with the second cooling medium of the second cooling system is divided into two, with an adjustment valve 9a and a heat exchanger 8a being provided on a path for cooling the subjects for cooling, and an adjustment valve 9b and a heat exchanger 8b being provided on a path for air conditioning the interior of the passenger compartment. Apart from this feature, the radiator 3, the fan 4, and the compressor 7 are the same as those of the first cooling system shown in FIG. 21.

According to this sixth embodiment, two refrigeration cycles are not provided separately for cooling the subjects for cooling such as the motor 1 and the inverter device 2 and so on, and for air conditioning of the air within the passenger compartment; rather, with a single refrigeration cycle, it is possible to implement both cooling of the devices for driving the electric vehicle, in other words cooling of the motor 1 and the inverter device 2, and also air conditioning of the air within the passenger compartment. By employing the heat generated by the motor 1 and the inverter device 2 for adjusting the temperature within the passenger compartment in this manner, it is possible to do without energy for providing thermal energy into the interior of the passenger compartment, so that the overall efficiency of the vehicle is enhanced. Furthermore, there is the additional merit that it is possible to make more compact a heat generation device for heating the interior of the passenger compartment, such as a heater or the like that converts electrical energy into thermal energy for ensuring a source of heat within the passenger compartment. Moreover, according to circumstances, the use of a special heat generation device becomes unnecessary. Yet further, it is possible to utilize the compressor 7, the fan 4, and the radiator 3 in common, so that the overall system is simplified. This leads to great reduction of cost.

—Variation of Seventh Embodiment—

Figure 24:
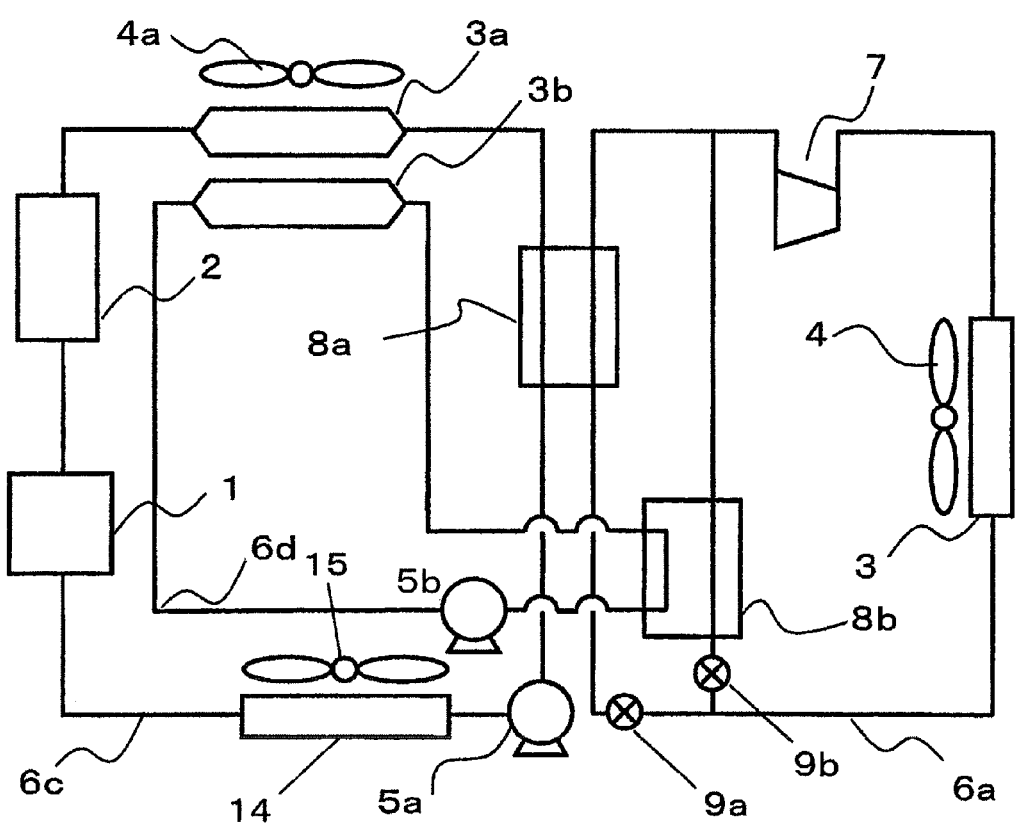
FIG. 24 is a figure showing the structure of a cooling system for an electric vehicle according to a variant of the seventh embodiment.

FIG. 24 shows the structure of a cooling system for an electric vehicle in a variant of the seventh embodiment shown in FIG. 23. It should be understood that the same reference symbols are appended to elements that are the same as elements shown in FIG. 23, and that the explanation will concentrate upon the points of difference. In this variant embodiment, the radiator 14 and the fan 15 of the circulation path 6c of the second cooling system for cooling the subjects for cooling are installed between the motor 1 and the pump 5a. It should be understood that the drive device for the fan 15 is omitted in FIG. 24. If some malfunction takes place in the first cooling system that includes the fan 4, the compressor 7, the adjustment valve 9 and so on, so that the capacity for cooling the motor 1 and the inverter device 2 is reduced, then the heat in the second cooling medium of the second cooling system is dissipated to the air that is being blown through the radiator 14 by the fan 15, so that a cooling capacity of the same order as that in the first embodiment shown in FIG. 1 is still ensured. Due to this, even if a malfunction takes place in the first cooling system, it is still possible to operate the electric vehicle continuously.

—Eighth Embodiment—

Figure 25:
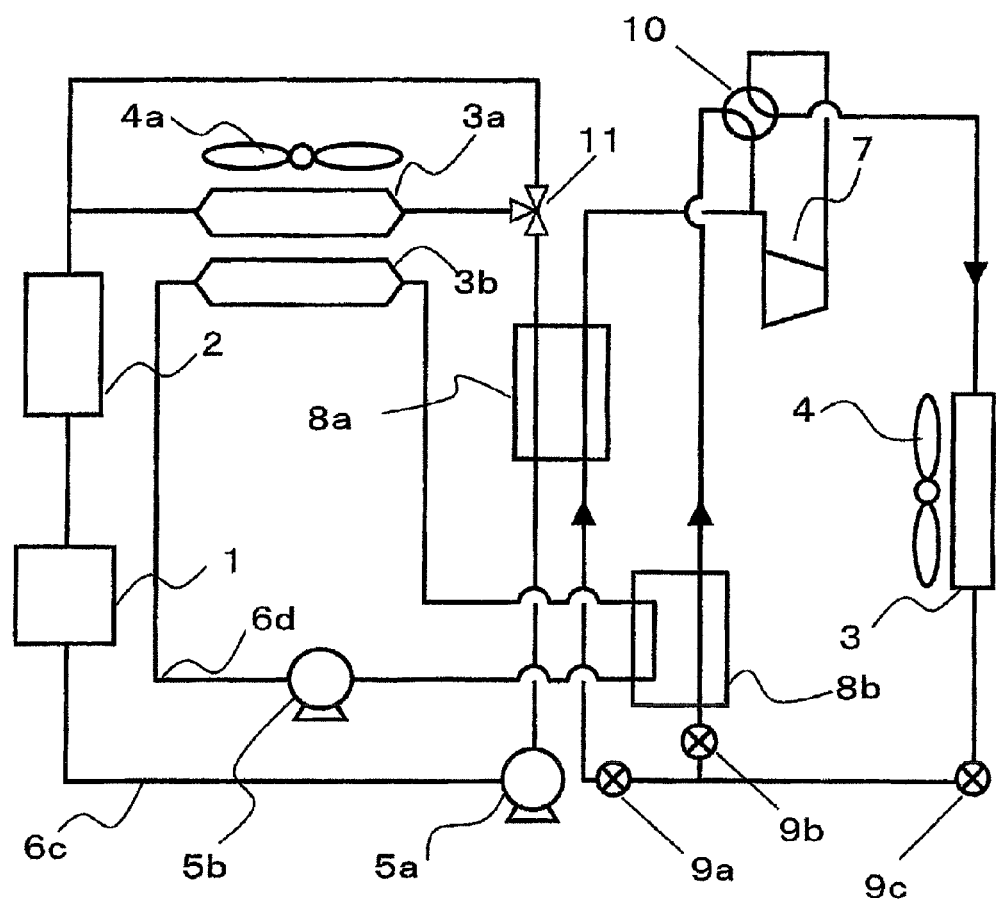
FIG. 25 is a figure showing the structure of a cooling system for an electric vehicle according to an eighth embodiment.

FIG. 25 shows the structure of a cooling system for an electric vehicle in the eighth embodiment. It should be understood that the same reference symbols are appended to elements that are the same as elements shown in FIG. 1 and FIG. 23, and that the explanation will concentrate upon the points of difference. Moreover, certain elements such as the fan drive device 21, the pump drive device 22, the control device 23, the vehicle speed sensor 24 and the accelerator sensor 25 connected to the control device 23 and so on described above are omitted from FIG. 25, and explanation thereof is also omitted. In this eighth embodiment, by contrast to the seventh embodiment shown in FIG. 23, a four-way valve 10 is installed at the discharge side of the compressor 7, and, in addition to air conditioning operation, it is also possible to perform operation for heating the passenger compartment by changing over the direction of circulation of the refrigerant in the refrigeration cycle. The arrow signs in FIG. 25 show the coolant circulation paths in the first cooling system, and shows the first cooling medium flow during air conditioning operation, in other words the direction of the refrigeration cycle. After the cooling medium that has been compressed by the compressor 7 has passed through the radiator 3 that serves as a condenser, it exchanges heat with the second cooling medium in the second cooling system via the heat exchangers 8a and 8b that serve as evaporators (thus cooling the second cooling medium), and then returns back to the compressor 7.

Figure 26:
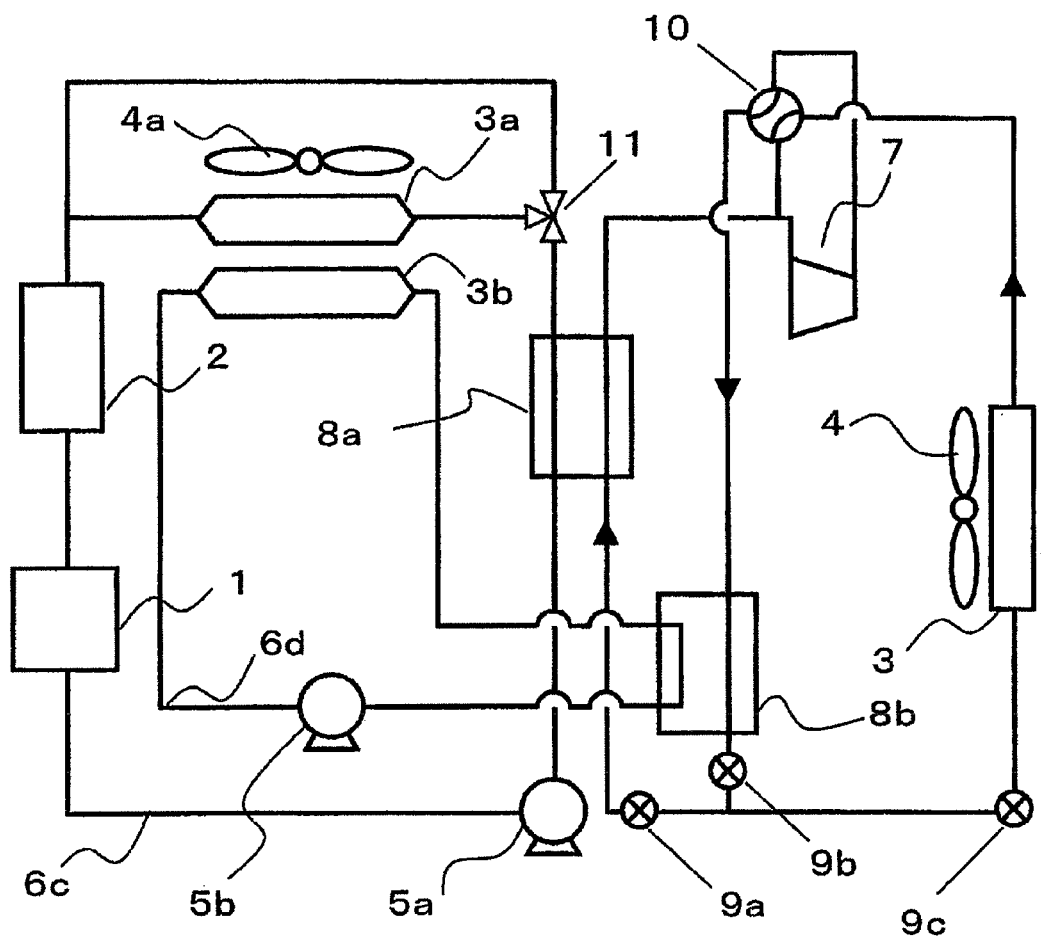
FIG. 26 is a figure showing a first cooling medium flow in the eighth embodiment during heating operation.

FIG. 26 shows the flows of the first cooling medium during passenger compartment heating operation, in this eighth embodiment. The cooling medium that has been compressed by the compressor 7 that serves as a condenser heats the second cooling medium by dissipating heat via the heat exchanger 8b to the second cooling medium that is flowing in the circulation path 6d of the second cooling system for air conditioning the interior of the passenger compartment, and returns to the compressor 7 after having passed through the heat exchanger 8a that serves as a condenser and the radiator 3. And, in the heat exchanger 8a, this flow exchanges heat with the second cooling medium that is flowing in the circulation path 6c of the second cooling system for cooling the subjects for cooling, and dissipates heat therein. In other words, since the heat due to cooling of the motor 1 and the inverter device 2 is dissipated to the first cooling medium of the first cooling system by the heat exchanger 8a, accordingly the heat generated by the motor 1 and the inverter device 2 comes to be utilized for the passenger compartment heating of the air conditioning. Due to this, it is possible to reduce the power required for passenger compartment heating.

According to this eighth embodiment, with one single system, it is possible to implement all of cooling of the devices that are the subjects for cooling, air conditioning of the interior of the passenger compartment, and heating of the interior of the passenger compartment. Moreover since, during the passenger compartment heating operation, the heat generated by the motor 1 and by the inverter device 2 can be employed for heating the passenger compartment, accordingly it becomes possible to perform the passenger compartment heating operation with higher efficiency.

It should be understood that it would also be acceptable to arrange to install the radiator 14 and the fan 15 shown in FIG. 24 between the motor 1 and the pump 5a in the circulation path 6c for cooling the subjects for cooling of this eighth embodiment shown in FIGS. 25 and 26, so as to arrange for backup during malfunctioning of the first cooling system.

—Ninth Embodiment—

Figure 27:
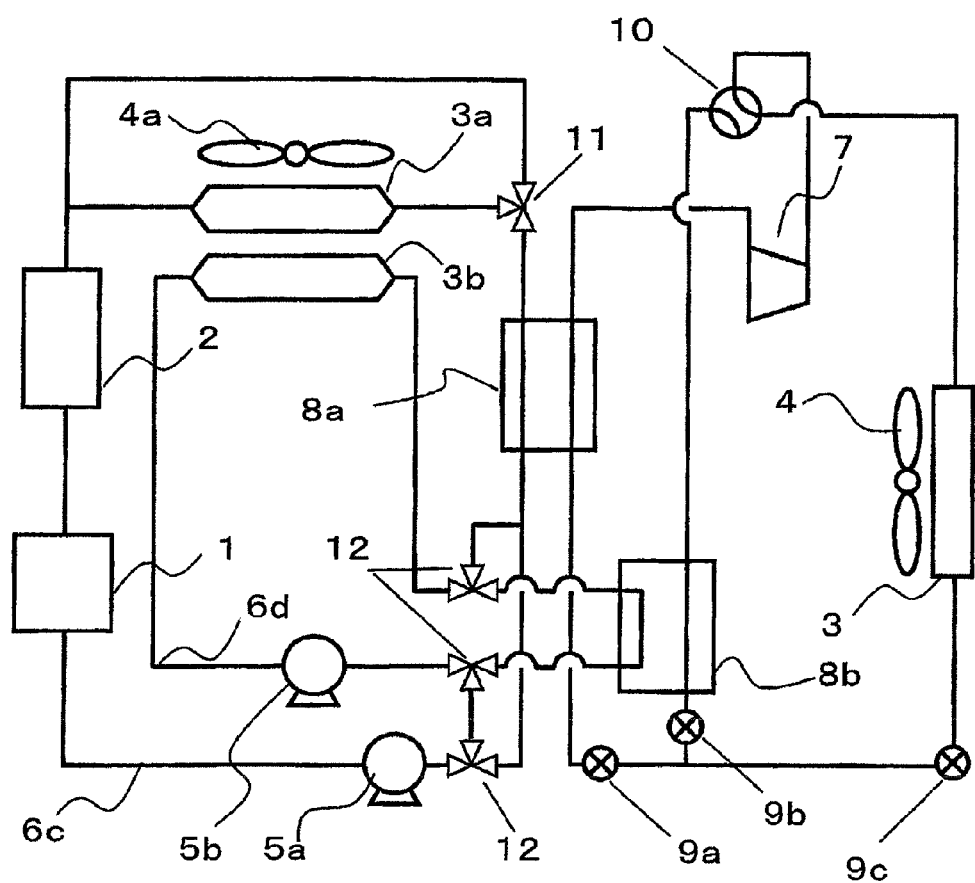
FIG. 27 is a figure showing the structure of a cooling system for an electric vehicle according to a ninth embodiment.
Figure 28:
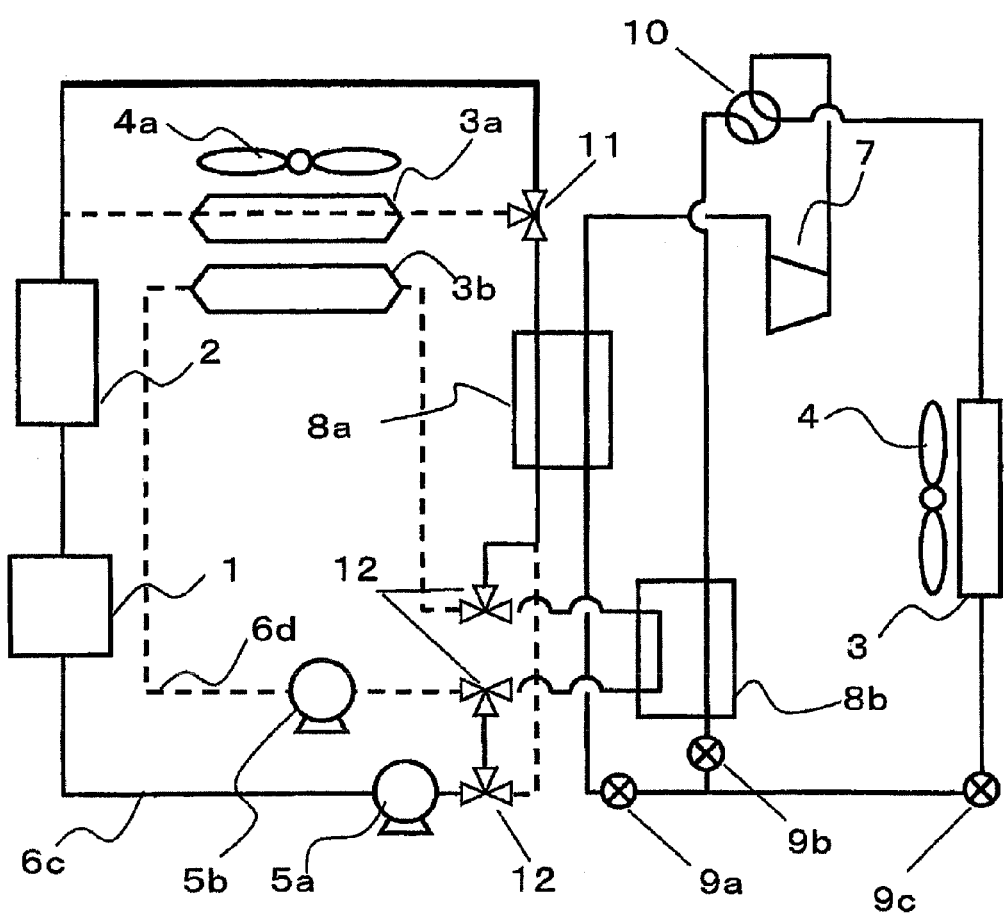
FIG. 28 is a figure showing a cooling medium flow in the cooling system for an electric vehicle according to the ninth embodiment, when high cooling capacity is to be obtained.

FIG. 27 shows the structure of a cooling system for an electric vehicle in the ninth embodiment. It should be understood that the same reference symbols are appended to elements that are the same as elements of the various embodiments described above, and that the explanation will concentrate upon the points of difference. Moreover, certain elements such as the fan drive device 21, the pump drive device 22, the control device 23, the vehicle speed sensor 24 and the accelerator sensor 25 connected to the control device 23 and so on described above are omitted from FIG. 27, and explanation thereof is also omitted. In this ninth embodiment, by contrast to the eighth embodiment shown in FIGS. 25 and 26, a three way valve 12 for flow conduit changeover is added, and thereby the cooling capacity for cooling the motor 1 and the inverter device 2 is enhanced. In other words, if it is desired to obtain a higher cooling capacity, then the three-way valve 12 for flow conduit changeover is set as shown in FIG. 28, so that cooling is performed by flowing the second cooling medium that flows in the circulation path 6c of the second cooling system for cooling the subjects for cooling to the two heat exchangers 8a and 8b in order. In FIG. 28, the paths shown by the solid line are paths along which cooling mediums flow, while the paths shown by the broken line are paths along which cooling mediums do not flow.

According to this ninth embodiment, while it becomes impossible to perform air conditioning of the interior of the passenger compartment, it is possible to cool the subjects for cooling with a higher cooling capacity. If it is desired to maintain compatibility with air conditioning the interior of the passenger compartment, then it would be acceptable to install two flow rate adjustment valves instead of the three-way valve 11 for bypass changeover, so that it is possible to adjust the flow rate of the second cooling medium that flows to the heat exchanger 3a for air conditioning the interior of the passenger compartment.

It should be understood that, in the circulation path 6c of the ninth embodiment shown in FIGS. 27 and 28 for cooling the subjects of cooling, it would also be acceptable to arrange to install the radiator 14 and the fan 15 shown in FIG. 24 between the motor 1 and the pump 5a, in order to provide backup during malfunctioning of the first cooling system.

—Tenth Embodiment—

Figure 29:
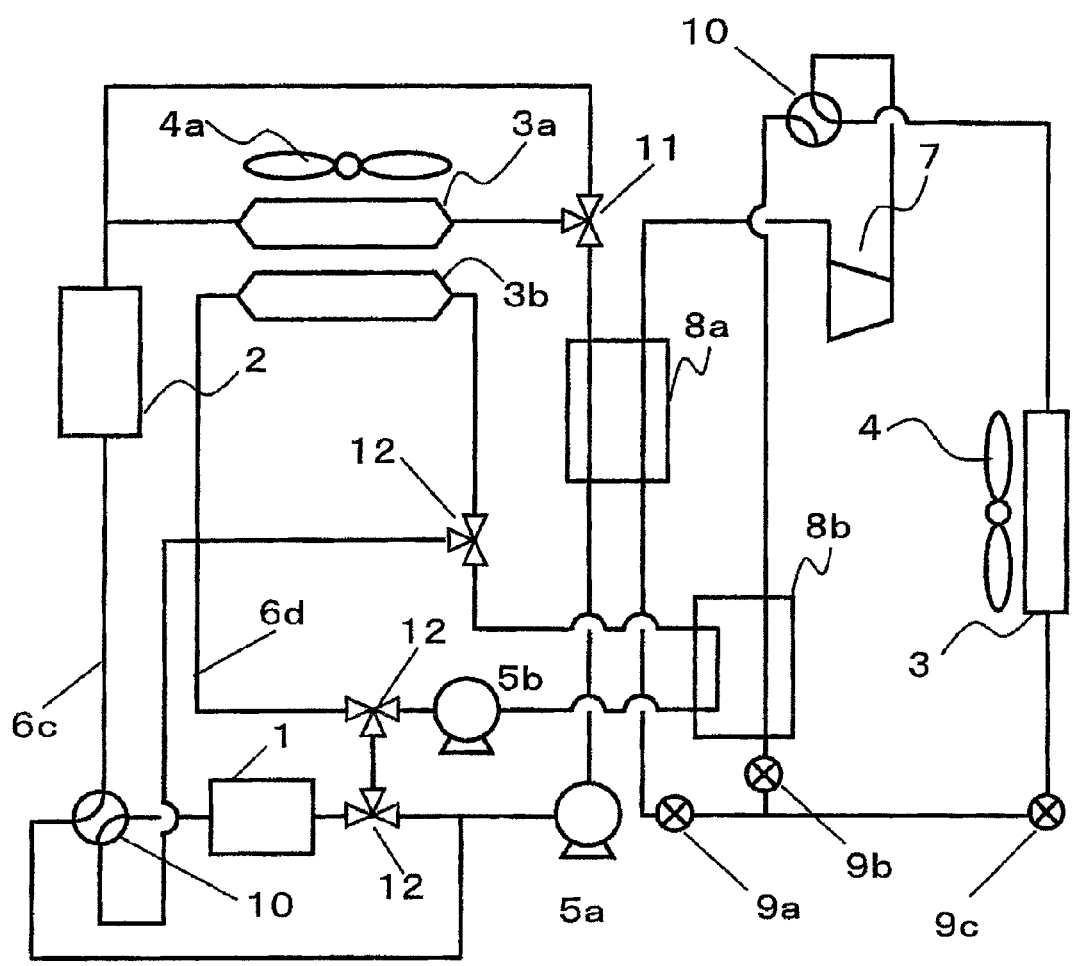
FIG. 29 is a figure showing the structure of a cooling system for an electric vehicle according to a tenth embodiment.

FIG. 29 shows the structure of a cooling system for an electric vehicle in the tenth embodiment. It should be understood that the same reference symbols are appended to elements that are the same as elements of the various embodiments described above, and that the explanation will concentrate upon the points of difference. Moreover, certain elements such as the fan drive device 21, the pump drive device 22, the control device 23, the vehicle speed sensor 24 and the accelerator sensor 25 connected to the control device 23, and so on described above are omitted from FIG. 29, and explanation thereof is also omitted. In this tenth embodiment, by contrast to the eighth embodiment shown in FIGS. 25 and 26, a three way valve 12 for flow conduit changeover is added, and the cooling capacity is enhanced by cooling the motor 1 and the inverter device 2 in parallel.

Figure 30:
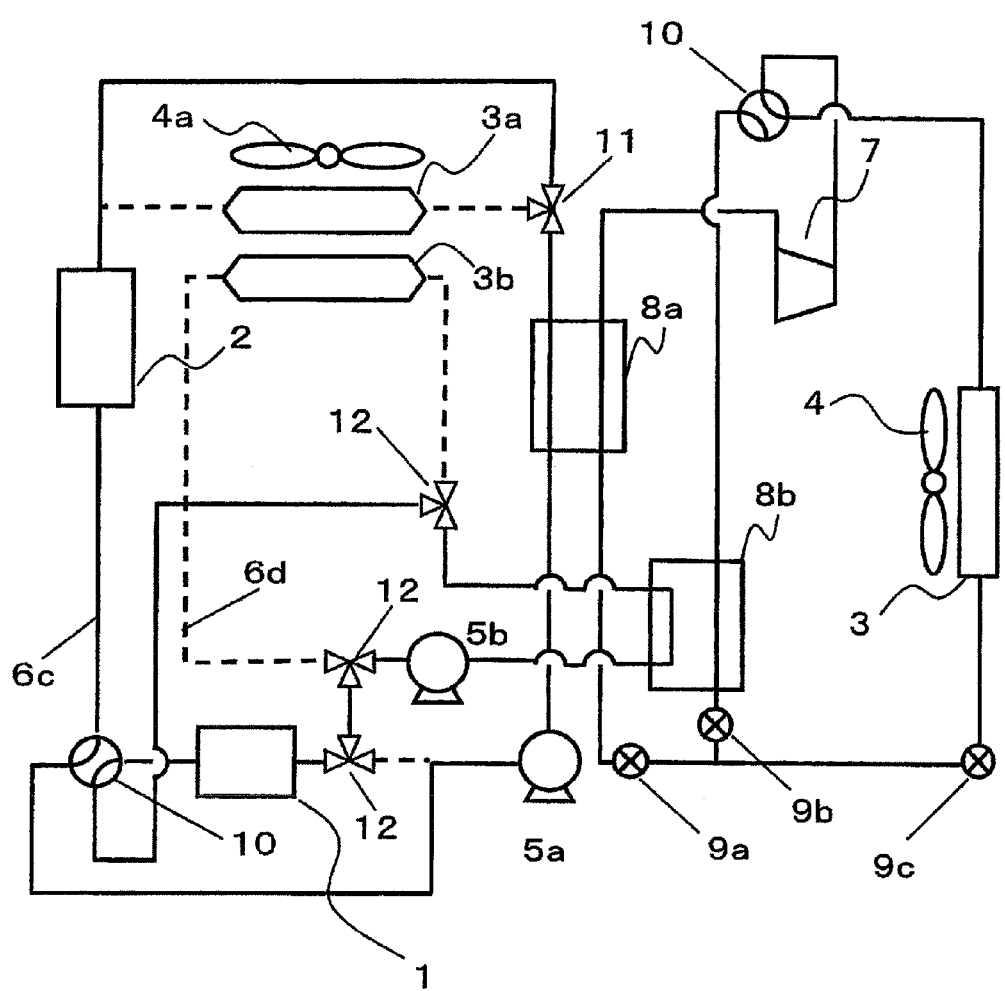
FIG. 30 is a figure showing a cooling medium flow in the cooling system for an electric vehicle according to the tenth embodiment, when high cooling capacity is to be obtained.

In other words, if it is desired to obtain a higher cooling capacity, then the three-way valve 12 for flow conduit changeover is set as shown in FIG. 30, and cooling of the motor 1 is performed by using the second cooling medium that has been pressurized by and expelled from the pump 5b and has been cooled by the heat exchanger 8b. Along with this, cooling of the inverter device 2 is performed by using the second cooling medium that has been pressurized by and expelled from the pump 5a and has been cooled by the heat exchanger 8a. In FIG. 30, the paths shown by the solid line are paths along which cooling mediums flow, while the paths shown by the broken line are paths along which cooling mediums do not flow. Due to this, while it becomes impossible to perform air conditioning of the interior of the passenger compartment, on the other hand it is possible to cool the subjects for cooling with a higher cooling capacity.

—Eleventh Embodiment—

An eleventh embodiment will now be explained, in which a cooling system for an electric vehicle according to one of the embodiments described above is actually mounted to an electric vehicle. While, in this eleventh embodiment, an example is shown in which a cooling system for an electric vehicle according to the sixth embodiment shown in FIG. 21 that incorporates a first cooling system and a second cooling system is mounted to an electric vehicle, it would also be possible, in the same manner, to mount a cooling system for an electric vehicle according to any one of the above described first through fifth or seventh through tenth embodiments.

Figure 31:
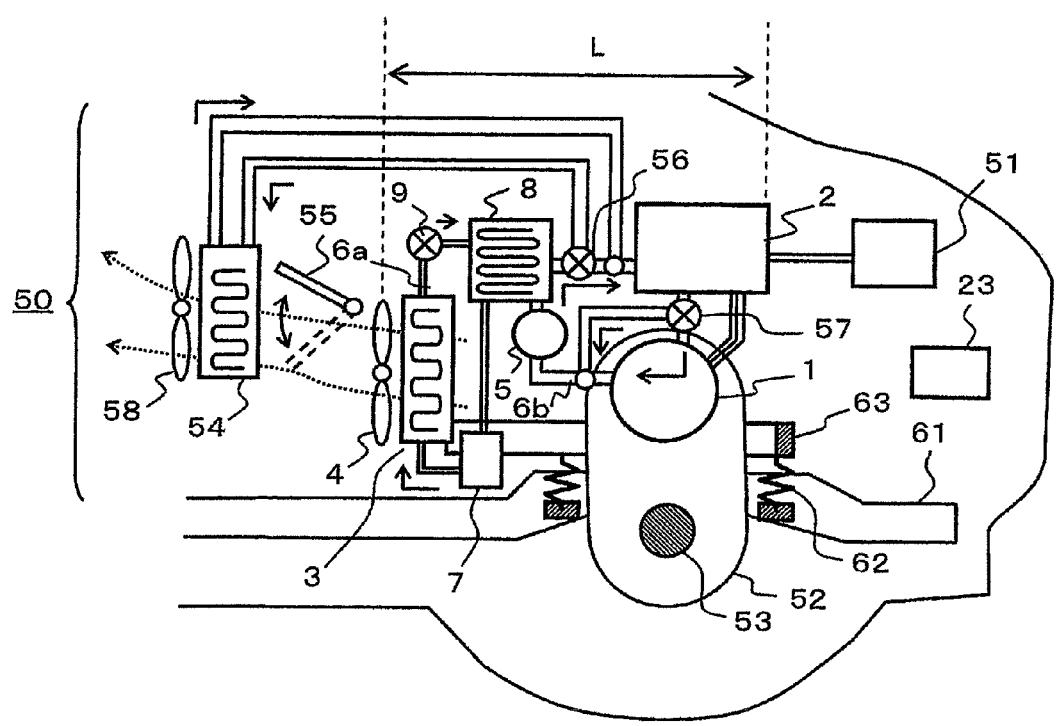
FIG. 31 is a figure showing an electric vehicle to which a cooling system according to the sixth embodiment has been mounted, as seen from horizontally.
Figure 32:
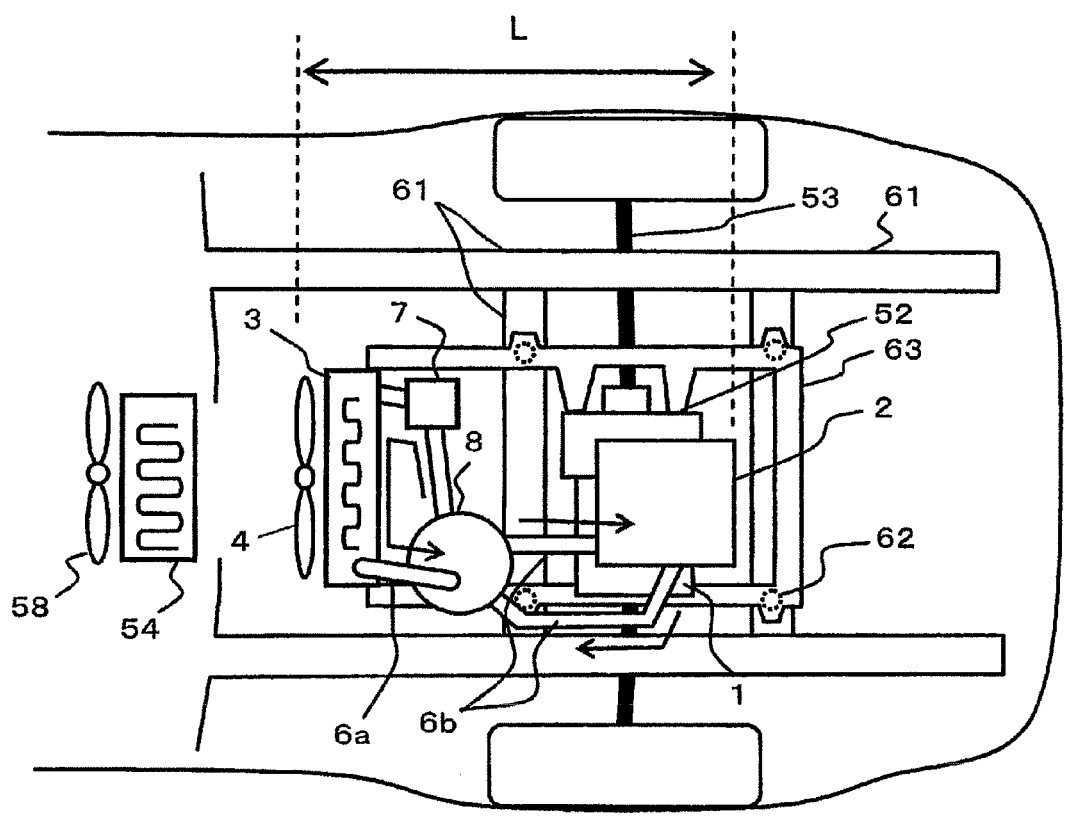
FIG. 32 is a figure showing an electric vehicle to which a cooling system according to the sixth embodiment has been mounted, as seen from above.

FIG. 31 is a figure showing the front portion of an electric vehicle to which this cooling system is mounted as seen from horizontally, and FIG. 32 is a figure showing the front portion of the same electric vehicle as seen from above. It should be understood that the same reference symbols are appended to elements that are the same as elements shown in FIG. 21. In FIGS. 31 and 32, the direction in which the vehicle is traveling is towards the right side of the drawing paper, and the electrical drive system for the electric vehicle is mounted at the front portion thereof While this embodiment is explained by citing an example of an electric vehicle of the front wheel drive type, it would also be possible to mount a cooling system for an electric vehicle according to the embodiments described above to an electric automobile of the rear wheel drive type or of the four wheel drive type, or to a hybrid automobile or the like.

This electrical drive system for an electric vehicle includes an electricity storage device 51 that accumulates drive energy, an inverter device 2 that controls the electrical power from the electricity storage device to a motor 1, the motor I that receives electrical power from the inverter device 2 and generates rotational torque, a speed reduction device 52 that amplifies the torque of the motor 1, drive shafts 53 that transmit the output torque of the speed reduction device 52 to the vehicle wheels, a control device 23 that controls the target torque of the motor 1 and the operational state of a cooling system according to the state of actuation by the driver and the state of the cooling system, and the cooling system 50 that cools the inverter device 2 and the motor 1. In the following, in particular, the motor 1, the inverter device 2, and the speed reduction device 52 will be termed "drive components".

This cooling system 50 includes a first cooling system that employs a refrigeration cycle and a second cooling system that employs water cooling (refer to FIG. 21). The first cooling system that employs a refrigeration cycle includes a compressor 7, a radiator (an external heat exchanger) 3, an adjuster 9 (i.e. an expansion valve), a heat exchanger 8, and a coolant circulation path 6a. The fan 4 is attached to the radiator 3, and blows air from in front of the vehicle against the radiator 3. The flow rate of this cooling draft is adjusted by the rotational speed of the fan 4 being controlled by a control device 23. On the other hand, the second cooling system that employs water cooling includes a pump 5, a heat exchanger 8, a heat exchanger 54 within the passenger compartment, a deflection plate 55, three-way valves 56 and 57, and a coolant circulation path (i.e. a cooling water conduit) 6b. A fan 58 is attached to the passenger compartment heat exchanger 54, and air conditioning within the passenger compartment is performed by air within the passenger compartment being blown thereby through the passenger compartment heat exchanger 54. The amount of this draft is adjusted by the rotational speed of the fan 58 being controlled by the control device 23.

While this feature is not shown in FIGS. 31 and 32, the temperatures of the drive components and of the cooling mediums in the cooling system 50 of this electric vehicle are detected and measured by temperature sensors and so on. The control device 23 controls the compressor 7, the fans 4 and 58, the pump 5, and the three-way valves 56 and 57 on the basis of the temperatures of the drive components and the cooling mediums and on the basis of the operational states of the structural components of the electrical drive system, and thereby controls the temperatures of the cooling mediums of the first cooling system and the second cooling system.

With this cooling system 50 for an electric vehicle, the refrigerant such as an alternative for chlorofluorocarbon or the like utilized in the refrigeration cycle flows in the coolant circulation path 6a of the first cooling system in which the compressor 7, the adjuster (expansion valve) 9, the radiator 3, and the heat exchanger 8 are communicated together, and this refrigerant is cooled by the refrigeration cycle that employs the compressor 7 as its power source. On the other hand, the cooling water including antifreeze or the like flows in the coolant circulation path of the second communication system in which the heat exchanger 8, the three-way valves 56 and 57, the inverter device 2, the motor 1, and the pump 5 are communicated together, and the drive components such as the inverter device 2, the motor 1 and so on and the interior of the passenger compartment are cooled thereby. It should be understood that it would also be acceptable to arrange to cool the electricity storage device 51 at the same time with the cooling medium of the second cooling system. The cooling medium in the coolant circulation path 6b of the second cooling system (such as cooling water or the like) passes through the heat exchanger 8, and is cooled by performing heat exchange (heat dissipation) in this heat exchanger 8 with the cooling medium that is flowing in the coolant circulation path 6a of the first cooling system. Moreover, the air for air conditioning the interior of the passenger compartment or for heating it is blown by the fan 58 through the passenger compartment heat exchanger 54 in the direction shown by the broken arrow signs in FIG. 31, and thereby the temperature within the passenger compartment is adjusted.

In this cooling system 50, the compressor 7, the operation of the fans 4 and 58, the pump 5, and the three-way valves 56 and 57 is controlled by the control device 23, and thereby it is possible to change the temperatures of the cooling mediums of the first cooling system and the second cooling system as desired. For example, if the load upon the inverter device 2 and the motor 1 is high and the temperatures of the drive components have become elevated, or if it is forecast in advance that elevation of the temperatures of the drive components will take place on the road to be traveled ahead, then the operational output of the cooling system 50 is increased, and thereby it is possible to lower the temperatures of the cooling mediums. Since generally the thermal capacity of the inverter device 2 is lower than that of the motor 1 and thus the rise of its temperature in response to increase of the drive load is faster, accordingly this inverter device 2 requires a lower cooling medium temperature and a higher cooling responsiveness than the motor 1. Therefore it is desirable to build the second cooling system so that the cooling medium that has flowed out from the heat exchanger 8 initially flows to the inverter device 2, and only thereafter flows to the motor 1.

In order for vibration and shifting due to the drive torque of the motor 1 not to be transmitted to the vehicle frame 61 (i.e. to the frame of the vehicle body), the motor 1 is mounted to the vehicle frame 61 via elastic support members (rubber mounts) 62 and a rigid sub-frame 63. The motor 1 is rigidly engaged to the sub-frame 63. And, as well as the motor 1, the cooling devices such as the inverter device 2, the compressor 7, the adjuster (expansion valve) 9, the radiator (i.e. the external heat exchanger) 3, the fan 4, the passenger compartment heat exchanger 54, the pump 5, the three-way valves 56 and 57, the heat exchanger 8 and so on are rigidly installed to the sub-frame 63. The structural components of the cooling system 50 (such as the adjuster 9, the compressor 7, the pump 5, the three-way valves 56 and 57, the heat exchanger 8, the radiator 3, the fan 4 and so on) and the inverter device 2 and the motor 1 are mutually connected together by the coolant circulation path 6a of the first cooling system and the coolant circulation path 6b of the second cooling system. Here, the structural components of the coolant circulation path 6a of the first cooling system and the coolant circulation path 6b of the second cooling system may be omitted if they are made as integrated structures. For example, if the inverter device 2 and the motor 1 are built within a single housing, then part of the coolant circulation path 6b of the second cooling system may be replaced by a flow conduit within the housing, so that it is possible further to shorten the length of this flow conduit.

If the radiator 3 of the cooling system 50 is installed in the vicinity of a bumper at the end of the vehicle body as in the case of a conventional vehicle radiator, then it is necessary to use elastic conduits such as rubber hoses or the like for connecting together the radiator 3 and the drive components (such as the inverter device 2 and the motor 1). This is in order to absorb, with these elastic members, relative displacement between the motor 1 and the vehicle body frame 61 originating in the drive torque. When connecting the radiator 3 and the drive components together via elastic conduits in this manner, it is necessary to connect them together via comparatively long elastic conduits in order to absorb such mutual relative displacement. Due to this, it takes a comparatively long time interval until the cooling medium in the second cooling system, whose temperature has been lowered by the refrigerant that has been cooled by the radiator 3 and that has arrived at the heat exchanger 8 and has cooled that cooling medium, arrives at the inverter device 2 and the motor 1.

With the cooling system 50 of this embodiment, it is arranged to install the inverter device 2, the motor 1, and the cooling system 50 upon the sub-frame 63 that is elastically supported on the vehicle body frame 61. Due to this, it is not necessary to accord any consideration to relative displacement between the motor 1 and the vehicle body frame 61 that originates in the drive torque of the motor 1, and it is possible to make the length of the conduits of the coolant circulation path 6a of the first cooling system and of the coolant circulation path 6b of the second cooling system comparatively shorter (or to omit them). Accordingly, while it is possible for the cooling medium that has been cooled by the radiator 3 to arrive at the inverter device 2 and the motor 1 within a short time interval, it is possible to reduce the volume and the thermal capacity of the cooling medium so that it is possible to change the temperature of the cooling medium rapidly, and accordingly it is possible to provide a cooling system 50 for an electric vehicle whose cooling responsiveness is excellent.

Furthermore, in this embodiment, the heat exchanger 8 is disposed between the radiator 3 and the inverter device 2. In other words, as shown in FIGS. 31 and 32, at least a part of the heat exchanger 8 is disposed in the region of the section L that indicates the longest distance between the radiator 3 and the inverter device 2. Due to this, it is possible to shorten the lengths of the conduits as compared to a configuration in which the heat exchanger 8 is disposed outside the section L, and it is possible to pressurize the cooling medium that has been cooled by the radiator 3 and the heat exchanger 8 and to send it to the inverter device 2 and the motor 1 within a short interval of time.

With the positional relationship between the heat exchanger 8, the radiator 3, and the inverter device 2 shown in FIG. 32, since the heat exchanger 8 is disposed at a position between the radiator 3 and the inverter device 2, accordingly it is possible to reduce the excess length of the conduits, so that it is possible to supply a cooling system 50 that has excellent cooling responsiveness.

Moreover, the coolant outlet of the radiator 3 is disposed closer to the heat exchanger 8 than its coolant inlet. Due to this, as compared to a case in which the coolant outlet of the radiator 3 is disposed further from the heat exchanger 8 than its coolant inlet, it is possible for the cooling medium that has been cooled by the radiator 3 to arrive at the coolant inlet of the heat exchanger 8 in a comparatively short time interval, so that it is possible to supply a cooling system 50 that has excellent cooling responsiveness. In a similar manner, the coolant outlet of the heat exchanger 8 is disposed closer to the inverter device 2 than its coolant inlet. Due to this, as compared to a case in which the coolant outlet is disposed further from the coolant inlet of the inverter device 2, it is possible for the cooling medium that has been cooled by the heat exchanger 8 to arrive at the inverter device 2 in a comparatively short time interval, so that it is possible to supply a cooling system 50 that has excellent cooling responsiveness.

With respect to the forward direction of the electric vehicle (the rightwards direction in FIG. 31), the radiator 3 is disposed more towards the rear of the vehicle than the drive components (i.e. the inverter device 2 and the motor 1). Due to this, if a movable wind deflection plate 55 is controlled to the position shown in FIG. 31 by the solid lines, then the waste heat of the radiator 3 that is emitted when cooling the drive components can be conducted to within the passenger compartment along the direction shown in FIG. 31 by the dotted lines. In particular, if the temperature of the cooling medium is controlled to be comparatively low in order to enhance the cooling performance for the drive components, then this may be done as an alternative to, or as well as, the function for heating the interior of the passenger compartment.

Next, the cooling operation of this embodiment will be explained. In air conditioning operation, the cooling medium of the coolant circulation path 6a of the first cooling system flows in the direction shown by the arrow signs in FIG. 31 due to the action of the compressor 7. The cooling medium is compressed into a gas at high pressure and high temperature by the compressor 7, and next emits heat to the air with the radiator (i.e. the external heat exchanger) 3 and condenses, so as to become a liquid at high pressure. Then the pressure of this cooling medium is reduced by the adjuster (i.e. the expansion valve) 9, so as to become coolant at low pressure and low temperature (i.e. coolant in a mixture of the two phases, liquid and gas). Then the cooling medium exchanges heat via the heat exchanger 8 with the cooling medium (for example, cooling water) that is flowing in the coolant circulation path 6b of the second cooling system. And the control device 23 adjusts the temperature and the flow rate of the cooling medium by controlling the operation of the compressor 7.

The cooling medium in the second cooling system that has thus been cooled by the heat exchanger 8 is pressurized by the pump 5 and expelled into the coolant circulation path 6b, and a portion of this cooling medium passes through the passenger compartment heat exchanger 54 and cools the air interior to the passenger compartment. Having thus cooled the passenger compartment, the cooling medium then flows to the inverter device 2 and the motor 1. But if the flow conduit to the passenger compartment heat exchanger 54 is intercepted by the three-way valve 56, then the cooling medium that has been pressurized to flow out of the heat exchanger 8 is sent directly to the inverter device 2 and the motor 1. The cooling medium of the second cooling system absorbs the heat of the inverter device 2 and the motor 1 so that its temperature becomes elevated, and then returns to the heat exchanger 8 via the pump 5. And, along with controlling the operation of the pump 5 and the fan 4, the control device 23 adjusts the temperature and the flow rate of the cooling medium in the second cooling system by changing over the flow conduits of the three-way valves 56 and 57.

For example, if there is a fear that the temperature of the inverter device or the motor 1 will rise in a short time interval, or if one of these temperatures exceeds its permitted range, then the flow of the cooling medium to the passenger compartment heat exchanger 54 due to the three-way valve 56 is intercepted, and the cooling medium is made to flow directly into the inverter device 2 or the motor 1. In other words, while preventing the temperature of the cooling medium from becoming elevated due to the passenger compartment heat exchanger 54, the refrigerant flow conduit from the heat exchanger 8 to the inverter device 2 and the motor 1 is also made shorter. Due to this, it is possible to lower the temperature of the cooling medium flowing into the inverter device 2 and the motor 1 in a short time interval, and thus it is possible to provide a cooling system 50 that is excellent in cooling responsiveness.

Moreover, if the temperature of the inverter device 2 is within the permitted range, then the cooling medium that flows out from the inverter device 2 flows into the motor 1 via the three-way valve 57, and cools the motor 1. However, if the temperature of the inverter device 2 is higher than the permitted range, or if there is a fear that it may become elevated within a short time interval, then the flow thereof to the motor 1 is intercepted by changing over the flow conduits of the three-way valve 57, and is fed back to the pump 5. If the load upon the inverter device drops, then the three-way valve 57 is controlled so that the cooling refrigerant also flows to the motor 1. By doing this, although the cooling of the motor 1 whose temperature rises comparatively gently is temporarily suspended, on the other hand it is possible rapidly to suppress rise of the temperature of the inverter device 2 whose temperature elevation is comparatively rapid, so that it is possible to provide a cooling system that is excellent from the point of view of cooling responsiveness.

Yet further, if it is necessary to raise the temperature interior to the passenger compartment at the same time as lowering the temperature of the cooling medium, then the three way valve 56 is controlled so that the cooling medium is not circulated to the passenger compartment heat exchanger 54. At the same time, the movable deflection plate 55 is controlled to the position shown in FIG. 1 by the solid lines, so that the heat that is emitted from the radiator 3 is conducted to the interior of the passenger compartment. By configuring the radiator 3 in a unitary manner with the inverter device 2 and the motor 1 in this manner, the distance between the radiator 3 and the interior of the passenger compartment becomes comparatively close, and it is possible to warm the passenger compartment with the waste heat from the radiator 3, even if the cooling medium is at a low temperature.

It should be understood that it would be possible to apply the embodiments and variant embodiments described above either individually or in any possible combination of embodiments and variant embodiments.

According to the embodiments and variant embodiments described above, beneficial operational effects may be obtained as follows. First, this cooling system for an electric vehicle includes: the coolant circulation path 6 that circulates a cooling medium to the motor 1 that electrically propels the vehicle and to the inverter device 2; the radiator 3 that performs heat exchange between the cooling medium and the external air; the pump 5 that circulates the cooling medium between the radiator 3, the motor 1, and the inverter device 2 via the coolant circulation path 6; the fan 4 that blows air through the radiator 3; and the control device that controls the pump 5 and the fan 4, thus controlling the cooling of the motor 1 and the inverter device 2. If the force for driving the vehicle due to the motor 1 and the inverter device 2 is in the first operational region, then the pump 5 and the fan 4 are controlled by the control device 23 in the first cooling mode, while, if the force for driving the vehicle due to the motor 1 and the inverter device 2 is in the second operational region that is higher than the first operational region, then the pump 5 and the fan 4 are controlled by the control device 23 in the second cooling mode in which the cooling capacity is higher than in the first cooling mode. Due to this it is possible to make the physical structures of the motor 1 and the inverter device 2 smaller, while obtaining an equal drive force to the prior art, therefore the physical structures of the motor 1 and the inverter device 2 (i.e. their sizes) is not excessively large. Furthermore, with this structure, since the cooling capacity is raised only when a high drive force is required, accordingly it is possible to reduce the amount of electrical power consumed by the pump 5 and the fan 4, and thus it is possible to enhance the overall operating efficiency of the electric vehicle.

According to the embodiments and variant embodiments described above, with this cooling system for an electric vehicle, the cooling capacity in the first cooling mode is made to be a cooling capacity that keeps the temperatures of the motor 1 and the inverter device 2 equal to their upper limit temperatures or below them, when force for driving the vehicle in the first operational region is continuously being generated by the motor 1 and the inverter device 2. Moreover, the cooling capacity in the second cooling mode is made to be a cooling capacity that keeps the temperatures of the motor 1 and the inverter device 2 equal to upper limit temperatures or below them, when force for driving the vehicle in the second operational region is being generated by the motor 1 and the inverter device 2 over a short time interval. Due to this, it is possible to determine the physical structures of the motor 1 and the inverter device 2 by taking, as references, the continuous rated torque and the continuous rated output of the motor 1 in the first operational region. Thus, it is possible to obtain the maximum short period torque and the maximum short period output of the motor 1 in the second operational region, while still being able to make the motor 1 and the inverter device 2 more compact, as compared to the physical structure of the motor 1 and the inverter device 2 in the prior art in which the maximum torque and the maximum output of the motor 1 in the second operational region were taken as references. Accordingly, while using a motor 1 and an inverter device 2 that are of smaller physical structure than in the prior art, a small torque and output are continuously generated from the motor 1 during steady traveling of the vehicle, and it is still possible to generate a large torque and output from the motor 1 over a short time interval during starting off of the vehicle from rest, during acceleration, during the ascent of a slope, or the like.

According to the embodiments and variant embodiments described above, with this cooling system for an electric vehicle, there are also included the vehicle speed sensor 24 that detects the vehicle speed and the accelerator sensor 25 that detects the amount of actuation of the accelerator pedal. The force for driving the vehicle is obtained on the basis of the vehicle speed detected by the vehicle speed sensor 24 and the acceleration pedal actuation amount detected by the accelerator sensor 25. It is arranged to select the first cooling mode or the second cooling mode, according to whether the operating point of torque and rotational speed of the motor 1 and the inverter device 2 corresponding to the force for driving the vehicle are in the first operational region or is in the second operational region. Due to this, it is possible accurately to select the cooling mode during traveling according to the torque and the output of the motor 1, and it is possible to perform cooling of the motor 1 and the inverter device 2 in an appropriate manner.

According to the embodiments and variant embodiments described above, with this cooling system for an electric vehicle, it is arranged to make the cooling capacity in the first cooling mode be a cooling capacity that can keep the temperatures of the motor 1 and the inverter device 2 at or below their upper limit temperatures when a force for driving the vehicle in the first operational region is being continuously generated by the motor 1 and the inverter device 2. Moreover, it is arranged to make the cooling capacity in the second cooling mode be a cooling capacity that can keep the temperatures of the motor 1 and the inverter device 2 at or below their upper limit temperatures when a force for driving the vehicle in the second operational region is being generated by the motor 1 and the inverter device 2 during a short time interval. Furthermore since, when cooling capacity is being provided in the second cooling mode, it is arranged for this cooling capacity to be provided in the region in which the rotational speed of the motor 1 is low, accordingly it is possible to obtain a higher motor output in the low rotational speed region of the motor 1.

According to the embodiments and variant embodiments described above, with this cooling system for an electric vehicle, the region where the operating efficiency of the motor 1 is high is set to the high rotational speed region of the motor 1. Since, due to this, the amount of heat generated by the motor 1 is reduced in the high vehicle speed region, accordingly it is possible to obtain a higher motor output in the high rotational speed region of the motor 1. And if the speed change ratio is fixed, then, by setting this fixed speed change ratio to an appropriate set value, it is possible to obtain the maximum drive force for the vehicle on the high vehicle speed side where the vehicle speed is higher than ½ of the highest vehicle speed.

According to the embodiments and variant embodiments described above, with this cooling system for an electric vehicle, the torque at the highest efficiency point of the operating efficiency of the motor 1 is included in the range of 50% to 75% of the maximum torque of the motor 1 with respect to the rotational speed at this highest efficiency point. Due to this, it is possible for the cooling system for an electric vehicle to have an appropriate cooling capacity without the amount of heat generated by the motor 1 being increased, while according consideration to the traveling resistance.

According to the embodiments and variant embodiments described above, with this cooling system for an electric vehicle, there is further included the navigation device 28 that acquires a path to the destination, the current position of the vehicle, and road information. And the operating point of the motor 1 and the inverter device 2 on the roads upon the path is forecast on the basis of the road information for the path to the destination. If, on the basis of the result of forecasting, there is a road for the second operational region within a predetermined distance ahead from the current position, then it is arranged to change over from the first cooling mode to the second cooling mode, even if the operating point of the motor 1 and the inverter device 2 at the current position is in the first operational region. Due to this, it is possible to keep the elevation of the temperatures of the motor 1 and the inverter device 2 upon a road section for the second operational region at temperatures that are lower than their upper limit temperatures. To put it in another manner, it is possible to provide some clearance until the upper limit temperatures are arrived at, and it is possible to set the short term rated torque and output in the second operational region at yet higher values.

According to the embodiments and variant embodiments described above, with this cooling system for an electric vehicle, there is also included the manual change over switch 29 for the operator of the vehicle to change over between the first cooling mode and the second cooling mode manually. If the second cooling mode is selected with this manual change over switch 29, then it is arranged to change over from the first cooling mode to the second cooling mode, even if the operating point of the motor 1 and the inverter device 2 is in the first operational region. Due to this, if the driver of the vehicle considers that he desires to increase the cooling capacity due to his driving taste or due to weather conditions or traveling conditions or the like during driving, then it is possible to perform cooling in the second cooling mode in which the cooling capacity is high by giving priority to the intentions of the driver, and accordingly it is possible effectively to incorporate a manual selection function into the function of automatic cooling mode selection.

According to the embodiments and variant embodiments described above, with this cooling system for an electric vehicle, there is further included the external air temperature sensor 31 that detects the external air temperature. And it is arranged to narrow down the first operational region and to widen the second operational region, the higher is the external air temperature that has been detected. Due to this, the higher the external air temperature becomes, the easier it becomes to change over to the second operational region, and thus it becomes possible to compensate for the reduction of the cooling capacity that accompanies elevation of the external air temperature.

According to the embodiments and variant embodiments described above, with this cooling system for an electric vehicle, a target temperature for the motor 1 is obtained that makes the sum of the losses generated by the motor 1 and the inverter device 2 for obtaining force for propelling the vehicle and the amount of electrical power consumed by the pump 5 and the fan 4 for cooling the amount of heat generated accompanying these losses become a minimum, and it is arranged to control the pump 5 and the fan 4 so that the temperature of the motor 1 becomes this target temperature. Due to this, it is possible to operate the motor 1, the inverter device 2, the fan 4, and the pump 5 at that motor temperature at which the combined efficiency becomes highest while taking into consideration, not only the efficiency of the motor 1, but also the amounts of electrical power consumed by the pump 5 and the fan 4 themselves for providing this cooling, so that it is possible to implement energy saving operation.

According to the embodiments and variant embodiments described above, with this cooling system for an electric vehicle, there are further included the driver identification device 30 that identifies the driver of the vehicle, and the memory 23m in which the driving history for each driver is stored. And it is arranged to read out from the memory 23m the driving history of the driver and to determine his driving tendency, and to change the boundary between the first operational region and the second operational region according to the driving tendency that is the result of this determination. Due to this, for a driver who demands more acceleration, the range of the second cooling mode in which the cooling capacity is high is increased even at the same operating point of the motor as in the case of an average driver, so that it is possible to perform cooling of the motor 1 and the inverter device 2 with a cooling capacity that is matched to the driving characteristics of the driver.

According to the embodiments and variant embodiments described above, with this cooling system for an electric vehicle, instead of the radiator 3, there is provided the separate coolant circulation path 6a that is different from the coolant circulation path 6b, and there are further provided: the compressor 7 that compresses refrigerant in this separate coolant circulation path 6a; the radiator 3 that dissipates heat in the refrigerant after compression to the external air and condenses it; the adjustment valve 9 that lowers the pressure of the cooled refrigerant after condensation; and the heat exchanger 8 that vaporizes the cooled refrigerant in the coolant circulation path 6b and thus removes heat from the cooled refrigerant. Due to this, it is possible to reduce the temperature of the cooling medium that flows in the coolant circulation path 6b to lower than the air temperature, so that it is possible further to enhance the cooling capacity.

According to the embodiments and variant embodiments described above, with this cooling system for an electric vehicle, it is arranged to dispose the inverter device 2 at the upstream side of the coolant circulation path, and to dispose the motor 1 at the downstream side thereof Due to this, it is possible to build a cooling system that is optimized in consideration of the thermal time constants of the motor 1 and the inverter device 2.

While various embodiments and variant embodiments have been explained in the above description, the present invention is not to be considered as being limited by the details thereof Other modes that may be considered to fall within the technical concept of the present invention are also included within its range.

The content of the disclosure of the following application, upon which priority is claimed, is hereby incorporated herein by reference:

Japanese Patent Application 2009-289592 (filed on Dec. 21, 2009).

The invention claimed is:

1. A cooling system for an electric vehicle, comprising:
a cooling unit configured to cool an electric drive unit that electrically drives the electric vehicle; and
a control unit configured to control the cooling unit, wherein
the control unit controls the cooling unit in a first cooling mode that provides a first cooling capacity when a force for driving the electric vehicle is in a first operational region, and controls the cooling unit in a second cooling mode that provides a second cooling capacity that is higher than the first cooling capacity when the force for driving the electric vehicle is in a second operational region that is higher than the first operational region,
in the second cooling mode, the control unit controls the cooling unit so that the second cooling capacity becomes higher as a rotational speed of the electric drive unit decreases,
the rotational speed at which a highest operating efficiency point of the electric drive unit is obtained is higher than the rotational speed that yields a maximum value of the second cooling capacity,
a temperature of the electric drive unit in the first cooling capacity does not exceed an upper limit temperature while the force for driving the electric vehicle in the first operational region is continuously generated by the electric drive unit,
a temperature of the electric drive unit in the second cooling capacity does not exceed the upper limit temperature while the force for driving the electric vehicle in the second operational region is generated over a short time interval by the electric drive unit,
the control unit is configured to calculate the force for driving the electric vehicle based upon a speed of the electric vehicle detected by a speed detecting unit of the electric vehicle and an amount of actuation of an accelerator pedal of the electric vehicle detected by an actuation amount detecting unit of the accelerator pedal,
the control unit is configured to select the first cooling mode or the second cooling mode according to whether an operating point, determined by a torque and a rotational speed of the electric drive unit corresponding to the force for driving the electric vehicle, is within the first operational region or within the second operational region, and
in the second cooling mode, the control unit is configured to control the cooling unit at the second cooling capacity that is proportional to an output generated by the electric drive unit.

2. A cooling system for an electric vehicle according to claim 1, wherein
a speed change ratio of the electric vehicle is determined so that the rotational speed at which the highest operating efficiency point of the electric drive unit is obtained becomes higher than the rotational speed that yields the maximum value of the second cooling capacity.

3. A cooling system for an electric vehicle according to claim 1, wherein
a speed of the electric vehicle that corresponds to the highest operating efficiency point of the electric drive unit is higher than ½ of a highest speed of the electric vehicle.

4. A cooling system for an electric vehicle, comprising:
a cooling unit configured to cool an electric drive unit that electrically drives the electric vehicle; and
a control unit configured to control the cooling unit, wherein
the control unit controls the cooling unit in a first cooling mode that provides a first cooling capacity when a force for driving the electric vehicle is in a first operational region, and controls the cooling unit in a second cooling mode that provides a second cooling capacity that is higher than the first cooling capacity when the force for driving the electric vehicle is in a second operational region that is higher than the first operational region, in the second cooling mode, the control unit controls the cooling unit so that the second cooling capacity becomes higher as a rotational speed of the electric drive unit decreases, the rotational speed at which a highest operating efficiency point of the electric drive unit is obtained is higher than the rotational speed that yields a maximum value of the second cooling capacity, and cooling of the electric drive is performed in response to an amount of heat generated by the electric drive unit during a time interval that is shorter than a time interval necessary for a temperature of the electric drive unit to increase, a temperature of the electric drive unit in the second cooling capacity does not exceed an upper limit temperature while the force for driving the electric vehicle in the second operational region is generated over a short time interval by the electric drive unit, the control unit is configured to select the first cooling mode or the second cooling mode according to whether an operating point, determined by a torque and a rotational speed of the electric drive unit corresponding to the force for driving the electric vehicle, is within the first operational region or within the second operational region, and in the second cooling mode, the control unit is configured to control the cooling unit at the second cooling capacity that is proportional to an output generated by the electric drive unit.

5. A cooling system for an electric vehicle according to claim 4, wherein a speed change ratio of the electric vehicle is determined so that the rotational speed at which the highest operating efficiency point of the electric drive unit is obtained becomes higher than the rotational speed that yields the maximum value of the second cooling capacity.

6. A cooling system for an electric vehicle according to claim 4, wherein a speed of the electric vehicle that corresponds to the highest operating efficiency point of the electric drive unit is higher than ½ of a highest speed of the electric vehicle.

* * * * *